United States Patent
Tingley et al.

(10) Patent No.: US 11,249,184 B2
(45) Date of Patent: Feb. 15, 2022

(54) AUTONOMOUS COLLISION AVOIDANCE THROUGH PHYSICAL LAYER TRACKING

(71) Applicant: The Charles Stark Draper Laboratory, Inc., Cambridge, MA (US)

(72) Inventors: Robert Tingley, Waltham, MA (US); Christopher Bessette, Melrose, MA (US); Troy B. Jones, Richmond, VA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 182 days.

(21) Appl. No.: 16/405,197

(22) Filed: May 7, 2019

(65) Prior Publication Data

US 2020/0355823 A1    Nov. 12, 2020

(51) Int. Cl.
*G01S 13/931* (2020.01)
*G01S 13/86* (2006.01)
(Continued)

(52) U.S. Cl.
CPC .......... *G01S 13/931* (2013.01); *B60W 30/09* (2013.01); *G01S 13/865* (2013.01); *G01S 13/867* (2013.01);
(Continued)

(58) Field of Classification Search
CPC .... G01S 13/931; G01S 13/867; G01S 13/865; G01S 13/862; G01S 2013/9327;
(Continued)

(56) References Cited

U.S. PATENT DOCUMENTS

| 5,917,920 A | 6/1999 | Humphries |
| 6,405,132 B1 | 6/2002 | Breed et al. |

(Continued)

FOREIGN PATENT DOCUMENTS

| CN | 102739301 A | 10/2012 |
| CN | 106882143 A | 6/2017 |

(Continued)

OTHER PUBLICATIONS

Ushani, A.K., et al. "Continuous-time Estimation for Dynamic Obstacle Tracking", 2015 IEEE/RSJ International Conference on Intelligent Robots and Systems, pp. 1137-1143; Sep. 28, 2015.
(Continued)

*Primary Examiner* — Marthe Y Marc-Coleman
(74) *Attorney, Agent, or Firm* — Hamilton, Brook, Smith & Reynolds, P.C.

(57) ABSTRACT

In an embodiment, a method includes separating a heterogeneous radio-frequency (RF) signal, received at multiple antennas, into multiple homogenous signals. The multiple antennas have a known positional arrangement. The method further includes estimating a location relative to the known positional arrangement of the antennas of an object producing the RF signal based on phase and amplitude of each homogeneous signal as received at each of the plurality of antennas. The location can further be estimated over multiple time steps, such that velocity and acceleration can be accelerated from the estimated locations.

16 Claims, 18 Drawing Sheets
(11 of 18 Drawing Sheet(s) Filed in Color)

(51) Int. Cl.
*B60W 30/09* (2012.01)
*G05D 1/00* (2006.01)

(52) U.S. Cl.
CPC ....... *G05D 1/0088* (2013.01); *B60W 2420/42* (2013.01); *B60W 2420/52* (2013.01); *G05D 2201/0213* (2013.01)

(58) Field of Classification Search
CPC .............. B60W 30/09; B60W 2420/42; G05D 1/0088; G05D 2201/0213
See application file for complete search history.

(56) References Cited

U.S. PATENT DOCUMENTS

| | | | |
|---|---|---|---|
| 6,926,374 | B2 | 8/2005 | Dudeck et al. |
| 7,202,776 | B2 | 4/2007 | Breed |
| 7,295,925 | B2 | 11/2007 | Breed et al. |
| 7,970,529 | B2 | 6/2011 | Mori |
| 8,493,198 | B1 | 7/2013 | Juan |
| 9,120,485 | B1 | 9/2015 | Dolgov |
| 9,151,626 | B1 | 10/2015 | Kojo |
| 9,195,894 | B2 | 11/2015 | Yasquez |
| 9,381,916 | B1 | 7/2016 | Zhu |
| 9,421,909 | B2 | 8/2016 | Strickland et al. |
| 9,428,186 | B2 | 8/2016 | Breed |
| 9,460,616 | B1 | 8/2016 | Tomohiro |
| 9,943,320 | B2 | 4/2018 | Klein |
| 10,007,269 | B1 | 6/2018 | Gray |
| 10,101,745 | B1 | 10/2018 | Sun |
| 10,377,735 | B2 | 8/2019 | Jones |
| 10,599,150 | B2 | 3/2020 | Graham et al. |
| 10,829,116 | B2 | 11/2020 | Iagnemma |
| 10,963,462 | B2 | 3/2021 | Sun |
| 11,014,555 | B1 | 5/2021 | Beauchamp et al. |
| 11,017,661 | B1 | 5/2021 | Beauchamp et al. |
| 11,062,606 | B2 | 7/2021 | Beauchamp |
| 2002/0065603 | A1 | 5/2002 | Walanabe |
| 2004/0167688 | A1 | 9/2004 | Karlsson |
| 2005/0134440 | A1 | 6/2005 | Breed |
| 2006/0092295 | A1 | 5/2006 | Mercer |
| 2008/0009965 | A1 | 1/2008 | Bruemmer |
| 2008/0243378 | A1 | 10/2008 | Zavoli |
| 2009/0040054 | A1 | 2/2009 | Wang et al. |
| 2009/0292468 | A1 | 11/2009 | Wu |
| 2010/0304426 | A1 | 2/2010 | Takiguchi |
| 2010/0062652 | A1 | 3/2010 | Anderson |
| 2010/0164789 | A1 | 7/2010 | Basnayake |
| 2010/0256852 | A1 | 10/2010 | Mudalige |
| 2011/0046843 | A1 | 2/2011 | Caveney |
| 2011/0190972 | A1 | 8/2011 | Timmons |
| 2011/0287280 | A1 | 11/2011 | Shiraki et al. |
| 2012/0291049 | A1 | 11/2012 | Park |
| 2012/0031504 | A1 | 12/2012 | Duhadway |
| 2012/0310516 | A1 | 12/2012 | Zeng |
| 2014/0055276 | A1 | 2/2014 | Logan |
| 2014/0142839 | A1 | 5/2014 | Kaminade |
| 2014/0195138 | A1 | 8/2014 | Stelzig |
| 2014/0231576 | A1 | 8/2014 | Rinker |
| 2014/0309836 | A1 | 10/2014 | Ollis |
| 2015/0254986 | A1 | 9/2015 | Fairfield |
| 2015/0369609 | A1 | 12/2015 | Roumeliotis |
| 2015/0378015 | A1 | 12/2015 | You |
| 2016/0047657 | A1 | 2/2016 | Caylor |
| 2016/0086347 | A1* | 3/2016 | Ishihara .............. H04N 5/23222 348/207.1 |
| 2017/0139411 | A1 | 5/2017 | Hartung |
| 2017/0188391 | A1 | 6/2017 | Sridhar et al. |
| 2017/0277193 | A1 | 9/2017 | Frazzoli |
| 2017/0277195 | A1 | 9/2017 | Frazzoli |
| 2017/0332340 | A1 | 11/2017 | Noh et al. |
| 2018/0024564 | A1 | 1/2018 | Matsuda |
| 2018/0038689 | A1 | 2/2018 | Takemura |
| 2018/0063458 | A1 | 3/2018 | Shida |
| 2018/0086336 | A1 | 3/2018 | Jones |
| 2018/0087907 | A1 | 3/2018 | Debitetto et al. |
| 2018/0089538 | A1 | 3/2018 | Graham et al. |
| 2018/0314247 | A1 | 11/2018 | Sun |
| 2018/0357772 | A1 | 12/2018 | Takemura |
| 2019/0132709 | A1* | 5/2019 | Graefe .................... H04W 4/38 |
| 2019/0220462 | A1 | 7/2019 | Sun |
| 2021/0287529 | A1 | 9/2021 | Beauchamp et al. |
| 2021/0287547 | A1 | 9/2021 | Beauchamp |

FOREIGN PATENT DOCUMENTS

| | | |
|---|---|---|
| CN | 106997689 A | 8/2017 |
| CN | 107731008 A | 2/2018 |
| CN | 107798916 A | 3/2018 |
| DE | 102013212710 | 11/2014 |
| DE | 102014110958 A1 | 4/2015 |
| DE | 102015001971 | 5/2016 |
| EP | 2731088 | 5/2014 |
| JP | 2010-221099 | 8/1998 |
| JP | H1172337 A | 8/1999 |
| JP | 2003123058 A | 10/2001 |
| JP | 2003205805 A | 1/2002 |
| JP | 2002092794 A | 3/2002 |
| JP | 2005352577 A | 12/2005 |
| JP | 2007-303841 | 11/2007 |
| JP | 2010-151829 | 7/2010 |
| JP | 201248537 A | 3/2012 |
| JP | 2012513651 A | 6/2012 |
| JP | 2012-242262 | 12/2012 |
| JP | 2014-066636 | 4/2014 |
| JP | 2015207129 A | 11/2015 |
| JP | 2016068774 | 5/2016 |
| JP | 2016115143 | 6/2016 |
| JP | 2016149110 | 8/2016 |
| JP | 2016177722 A | 10/2016 |
| JP | 2017027599 A | 2/2017 |
| KR | 1020140103983 | 8/2014 |
| KR | 20160087277 A | 7/2016 |
| KR | 20160147559 A | 12/2016 |
| KR | 20170025179 A | 3/2017 |
| WO | 2012172632 | 12/2012 |
| WO | 2015008290 | 1/2015 |
| WO | 2016110728 | 6/2015 |
| WO | 2017135998 A | 8/2017 |
| WO | 201819941 | 1/2018 |
| WO | 2019213763 A1 | 11/2019 |

OTHER PUBLICATIONS

Ward, E., et al. "Vehicle Localization with Low Cost Radar Sensors", 2016 IEEE Intelligent Vehicles Symposium, pp. 864-870, Jun. 19, 2016.

Dissanayake, M.W.M.G., et al., "A Solution to the Simultaneous Localization and Map Building (SLAM) Problem", IEEE Transactions on Robotics and Automation, pp. 229-241, Jan. 1, 2001.

Mouikis, A.I., et al., "A Multi-State Constraint Kalman Filter for Vision-aided Inertial Navigation," 2007 IEEE International Conference on Robotics and Automation, pp. 3565-3572, Apr. 10-14, 2007.

International Search Report and Written Opinion for PCT/US2016/054423 entitled "Autonomous Vehicle: Object-level Fusion" dated Jun. 8, 2017.

International Search Report and Written Opinion for PCT/US2016/054438 entitled "Autonomous Vehicle: Vehicle Localization" dated Sep. 21, 2017.

International Search Report and Written Opinion for PCT/US2016/054466 entitled "Autonomous Vehicle with Modular Architecture" dated May 30, 2017.

International Search Report and Written Opinion of PCT/US2017/029637 entitled "Enhancing Autonomous Vehicle Perception With Off-Vehicle Collected Data" dated Dec. 11, 2017.

Qualcomm, "Accelerating C-V2X commercialization", https://www.qualcomm.com/media/documents/files/accelerating-c-v2x-commercialization.pdf; May 13, 2018 per Internet archive.

Dignan, L., "Here's how C-V2X can change driving, smart cities", Between the Lines' https://www.zdnet.com/article/what-is-c-v2x-and-how-it-changes-the-driving-smart-cities/. (Jan. 11, 2019).

(56) References Cited

OTHER PUBLICATIONS

Machine Translation of Office Action drafted on dated May 11, 2021 in corresponding Japanese Patent Application No. 2019-559696. (Drafted on Apr. 28, 2021).

* cited by examiner

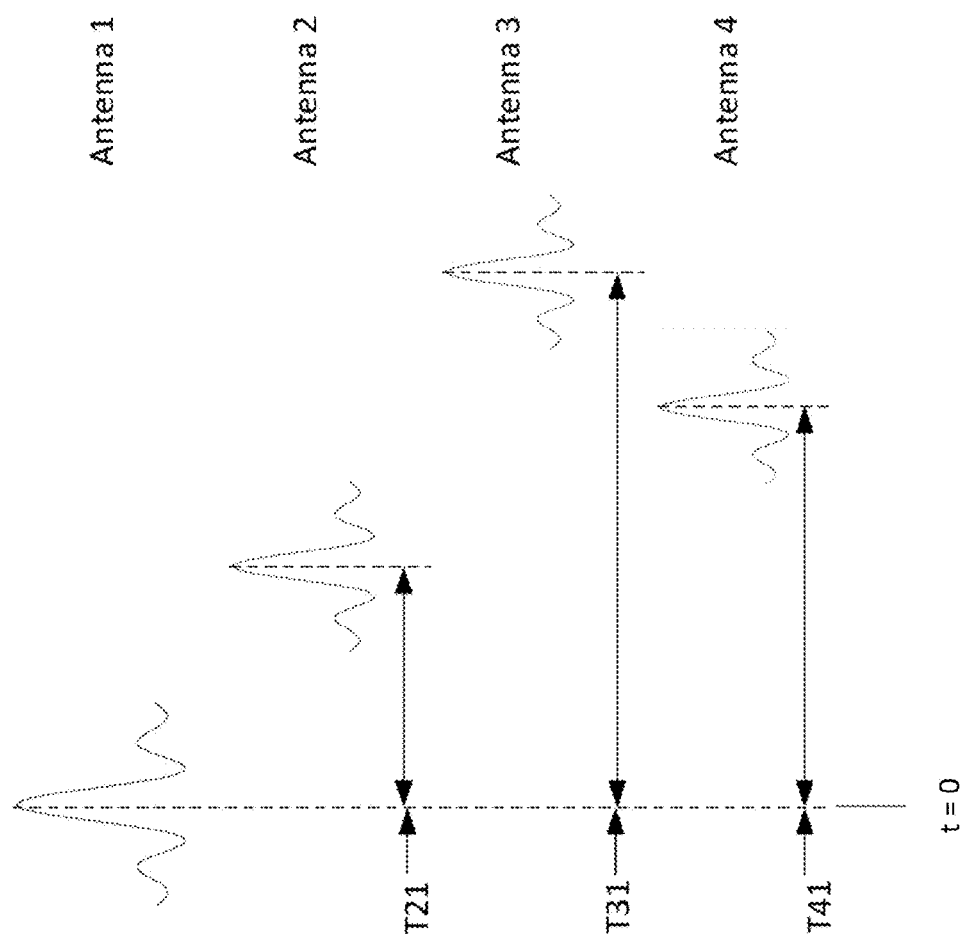

Fig. 12   1200
$R_{2T} - R_{1T} = c \times T_{21}$
$R_{3T} - R_{1T} = c \times T_{31}$
$R_{4T} - R_{1T} = c \times T_{41}$
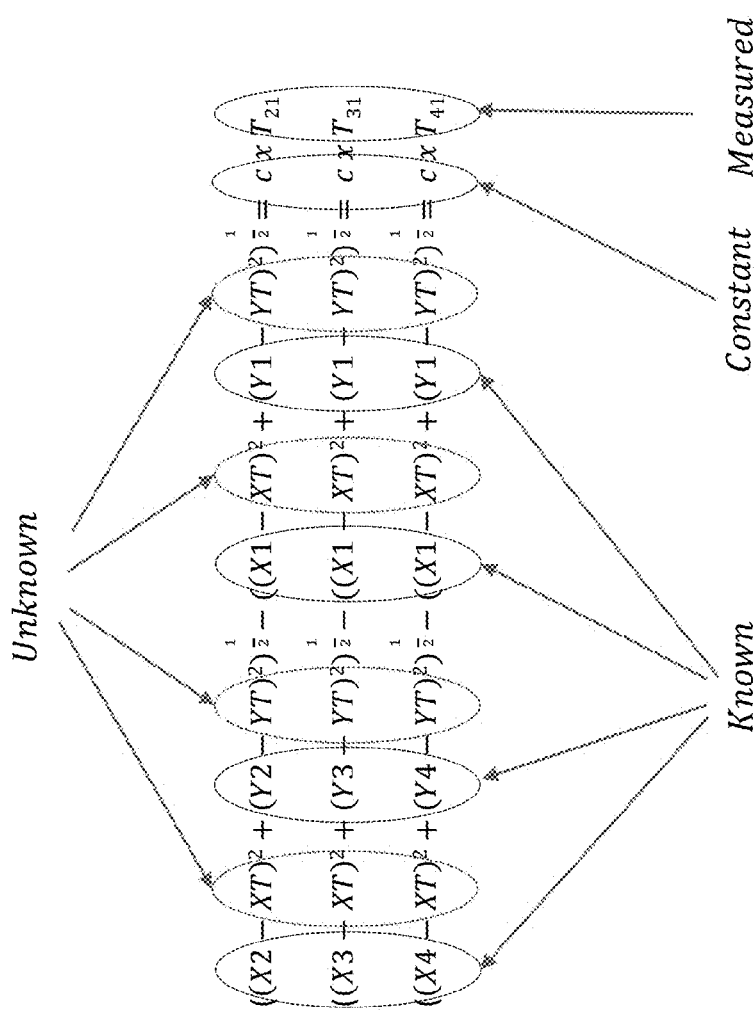

1502

1504

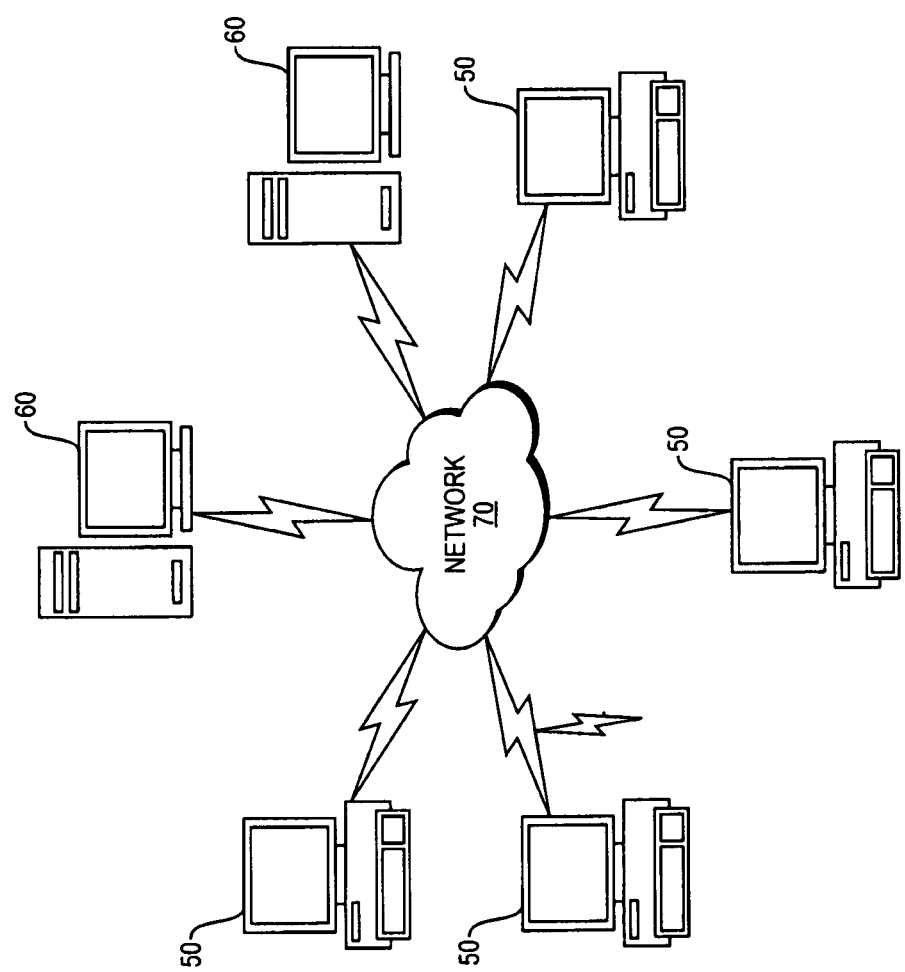

AUTONOMOUS COLLISION AVOIDANCE THROUGH PHYSICAL LAYER TRACKING

BACKGROUND

Object detection through various types of sensors is well known. For example, sensors such as radars, lidars, stereo vision sensors, and others can detect objects near or within line of sight of the sensor. Other systems can fuse the outputs of each sensor to determine objects.

SUMMARY

In an embodiment, a method includes separating a heterogeneous radio-frequency (RF) signal, received at multiple antennas, into multiple homogenous signals. The multiple antennas have a known positional arrangement. The method further includes estimating a track including a location relative to the known positional arrangement of the antennas of an object producing the RF signal based on phase and amplitude of each homogeneous signal as received at each of the plurality of antennas. The method further includes determining whether the track of the object correlates with a second track of the object in an object list, the tracks of the objects in the object list determined by a perception controller and inputs from one or more of a radar system, lidar system, and stereo vision system In an embodiment, separating the heterogeneous RF signal into homogeneous signals includes separating the heterogeneous RF signal by one or more of waveform separation, frequency band separation, or other signal separation.

In an embodiment, separating the heterogeneous RF signal includes separating one or more of: a Long-Term Evolution (LTE) signal, a 3G signal, a 4G signal, a 5G signal, other cell phone signal, a WiFi signal, a WiMax signal, a Bluetooth signal, and a RF signal generated by a processor into respective homogeneous signals of the plurality of homogeneous signals.

In an embodiment, separating the heterogeneous RF signal further includes monitoring the heterogeneous RF signal for a handshake pattern.

In an embodiment, the method includes estimating at least one of a velocity and an acceleration of the object producing the RF signal.

In an embodiment, the plurality of antennas are mounted on a vehicle, and the method further includes determining, at the vehicle, whether the estimated location correlates with an object in an object list. The method further includes, if the determination correlates the estimated location with the object, adding the estimated location to data associated with the object in the object list. The method further includes otherwise (e.g., if the determination does not correlate the estimated location with the found object), adding a new object having the estimated location to an object list of objects detected by sensor from on-board sensors of the vehicle.

In an embodiment, the method further includes forwarding the object or new object to a perception controller. The perception controller can be configured to determine a path for the vehicle that avoids the found object or the new object.

In an embodiment, a heterogeneous signal includes multiple wireless signals. Each wireless signal can be emitted from different sources. More than one wireless signal can emit from the same object, for example (e.g., WiFi, Bluetooth®, and background processor emissions). A homogenous signal is a signal from one source, isolated from other signals. A signal can also be homogenous if only one signal is being transmitted.

In an embodiment, a system includes multiple antennas having a known positional arrangement. The system further includes a processor configured to separate a heterogeneous radio-frequency (RF) signal, received at the multiple antennas into multiple homogeneous signals. In an embodiment, the system further estimates a track including a location relative to the known positional arrangement of the antennas of an object producing the RF signal based on phase and amplitude of each homogeneous signal as received at each of the plurality of antennas. The system further determines whether the track of the object correlates with a second track of the object in an object list, the tracks of the objects in the object list determined by a perception controller and inputs from one or more of a radar system, lidar system, and stereo vision system

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 11 is a diagram illustrating example embodiments of a waveform as received at each of a plurality of antennas.

FIG. 12 is a diagram illustrating an example embodiment of calculating position of an object.

FIG. 17 illustrates a computer network or similar digital processing environment in which embodiments of the present invention may be implemented.

DETAILED DESCRIPTION

A description of example embodiments follows.

In the context of highly automated vehicles, sometimes referred to as self-driving cars, detecting the surrounding world is a primary objective. This has been done through a variety of techniques, including utilizing radar, lidar, camera imaging systems. Further, the outputs of those systems can be fused together to create a cohesive model of the world around the vehicle. Therefore, additional methods to sense the surrounding world can increase the accuracy of such a model. Herein, Applicant discloses a system and corresponding method for detecting the presence of electronic devices in proximity to a vehicle based on radio-frequency (RF) or other electromagnetic (EM) signals that the devices emit. Such a system can determine the distance and direction of the devices based on the signals they emit without reading the data within those signals. The location data generated by Applicant's system can further be used by fusion techniques that combine data from other sensors into an improved model of the world around the vehicle.

Figure 1:
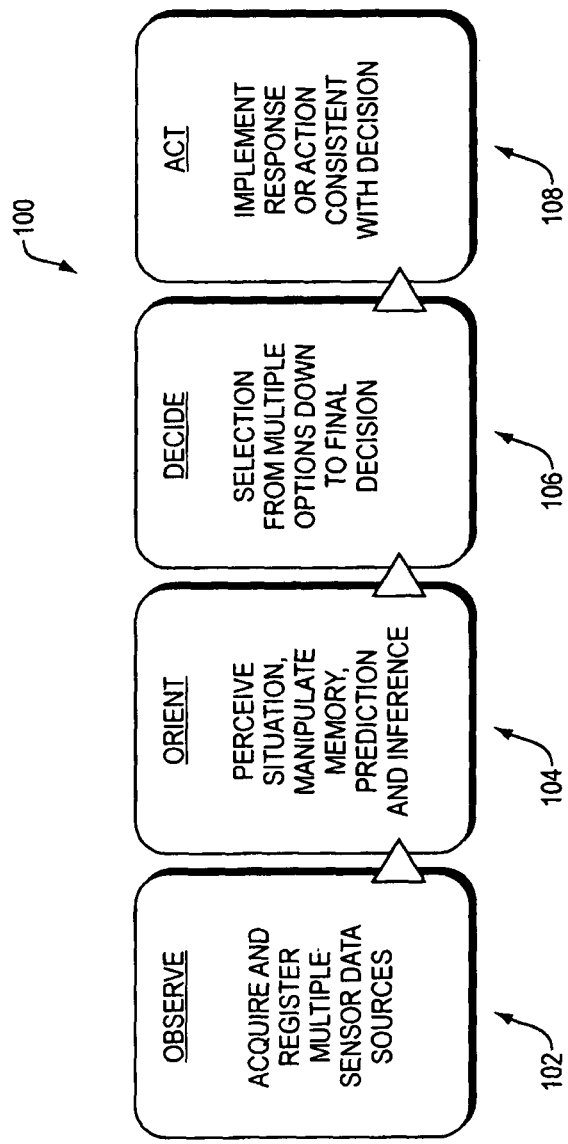
FIG. 1 is a diagram illustrating steps in an embodiment of an automated control system of the Observe, Orient, Decide, and Act (OODA) model.

FIG. 1 is a diagram illustrating steps in an embodiment of an automated control system of the Observe, Orient, Decide, and Act (OODA) model. Automated systems, such as highly-automated driving systems, or, self-driving cars, or autonomous vehicles, employ an OODA model. The observe virtual layer 102 involves sensing features from the world using machine sensors, such as laser ranging, radar, infrared, vision systems, or other systems. The orientation virtual layer 104 involves perceiving situational awareness based on the sensed information. Examples of orientation virtual layer activities are Kalman filtering, model based matching, machine or deep learning, and Bayesian predictions. The decide virtual layer 106 selects an action from multiple objects to a final decision. The act virtual layer 108 provides guidance and control for executing the decision.

Figure 2:
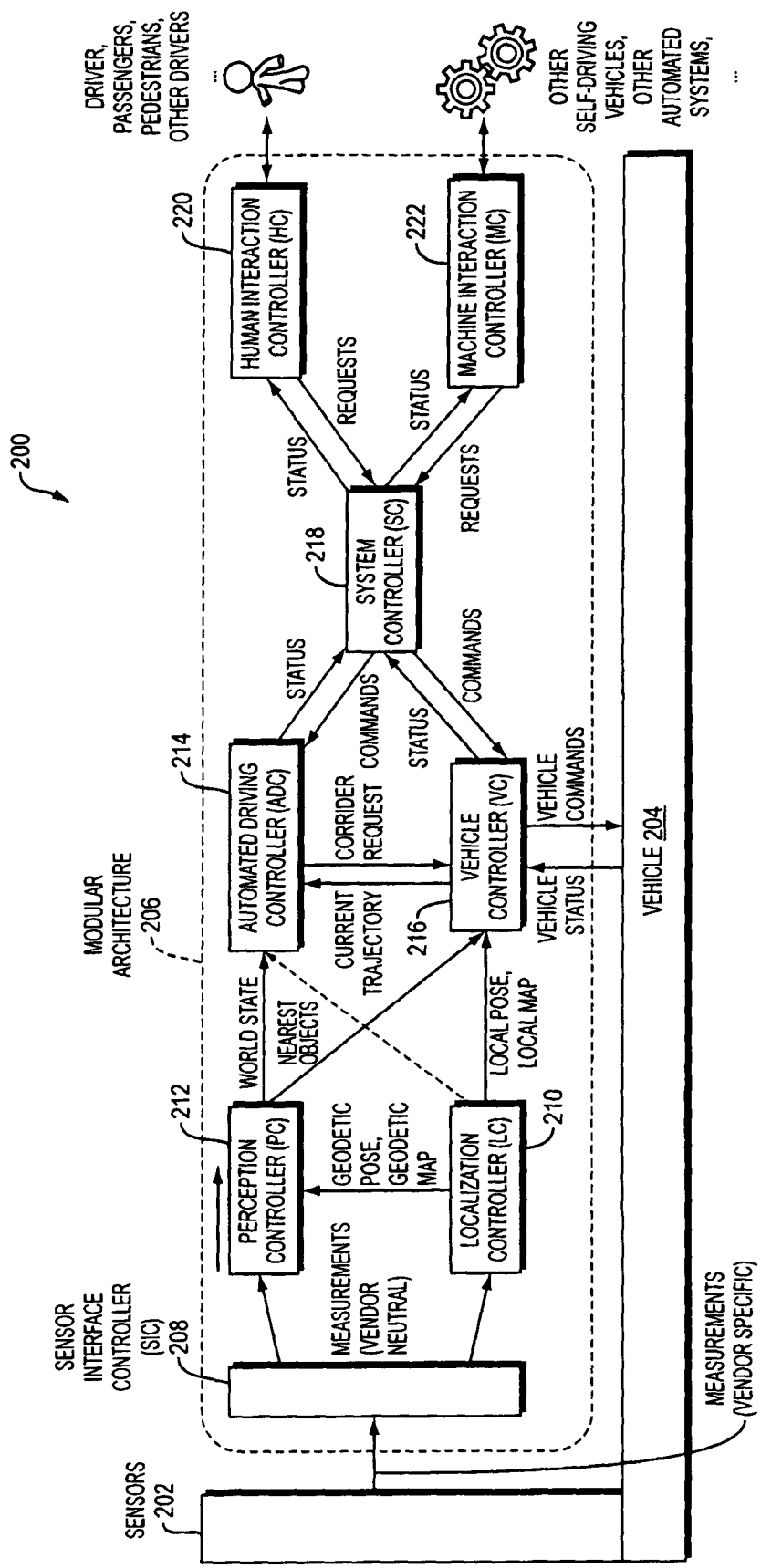
FIG. 2 is a block diagram of an embodiment of an autonomous vehicle high-level architecture.

FIG. 2 is a block diagram 200 of an embodiment of an autonomous vehicle high-level architecture 206. The architecture 206 is built using a top-down approach to enable fully automated driving. Further, the architecture 206 is preferably modular such that it can be adaptable with hardware from different vehicle manufacturers. The architecture 206, therefore, has several modular elements functionally divided to maximize these properties. In an embodiment, the modular architecture 206 described herein can interface with sensor systems 202 of any vehicle 204. Further, the modular architecture 206 can receive vehicle information from and communicate with any vehicle 204.

Elements of the modular architecture 206 include sensors 202, Sensor Interface Controller (SIC) 208, localization controller (LC) 210, perception controller (PC) 212, automated driving controller 214 (ADC), vehicle controller 216 (VC), system controller 218 (SC), human interaction controller 220 (HC) and machine interaction controller 222 (MC).

Referring again to the CODA model of FIG. 1, in terms of an autonomous vehicle, the observation layer of the model includes gathering sensor readings, for example, from vision sensors, Radar (Radio Detection And Ranging), LIDAR (LIght Detection And Ranging), and Global Positioning Systems (GPS). The sensors 202 shown in FIG. 2 shows such an observation layer. Examples of the orientation layer of the model can include determining where a car is relative to the world, relative to the road it is driving on, and relative to lane markings on the road, shown by Perception Controller (PC) 212 and Localization Controller (LC) 210 of FIG. 2. Examples of the decision layer of the model include determining a corridor to automatically drive the car, and include elements such as the Automatic Driving Controller (ADC) 214 and Vehicle Controller (VC) 216 of FIG. 2. Examples of the act layer include converting that corridor into commands to the vehicle's driving systems (e.g., steering sub-system, acceleration sub-system, and breaking sub-system) that direct the car along the corridor, such as actuator control 410 of FIG. 4. A person of ordinary skill in the art can recognize that the layers of the system are not strictly sequential, and as observations change, so do the results of the other layers. For example, after the system chooses a corridor to drive in, changing conditions on the road, such as detection of another object, may direct the car to modify its corridor, or enact emergency procedures to prevent a collision. Further, the commands of the vehicle controller may need to be adjusted dynamically to compensate for drift, skidding, or other changes to expected vehicle behavior.

At a high level, the module architecture 206 receives measurements from sensors 202. While different sensors may output different sets of information in different formats, the modular architecture 206 includes Sensor Interface Controller (SIC) 208, sometimes also referred to as a Sensor Interface Server (SIS), configured to translate the sensor data into data having a vendor-neutral format that can be read by the modular architecture 206. Therefore, the modular architecture 206 learns about the environment around the vehicle 204 from the vehicle's sensors, no matter the vendor, manufacturer, or configuration of the sensors. The SIS 208 can further tag each sensor's data with a metadata tag having its location and orientation in the car, which can be used by the perception controller to determine the unique angle, perspective, and blind spot of each sensor.

Further, the modular architecture 206 includes vehicle controller 216 (VC). The VC 216 is configured to send commands to the vehicle and receive status messages from the vehicle. The vehicle controller 216 receives status messages from the vehicle 204 indicating the vehicle's status, such as information regarding the vehicle's speed, attitude, steering position, braking status, and fuel level, or any other information about the vehicle's subsystems that is relevant for autonomous driving. The modular architecture 206, based on the information from the vehicle 204 and the sensors 202, therefore can calculate commands to send from the VC 216 to the vehicle 204 to implement self-driving. The functions of the various modules within the modular architecture 206 are described in further detail below. However, when viewing the modular architecture 206 at a high level, it receives (a) sensor information from the sensors 202 and (b) vehicle status information from the vehicle 204, and in turn, provides the vehicle instructions to the vehicle 204. Such an architecture allows the modular architecture to be employed for any vehicle with any sensor configuration. Therefore, any vehicle platform that includes a sensor subsystem (e.g., sensors 202) and an actuation subsystem having the ability to provide vehicle status and accept driving commands (e.g., actuator control 410 of FIG. 4) can integrate with the modular architecture 206.

Within the modular architecture 206, various modules work together to implement automated driving according to the OODA model. The sensors 202 and SIC 208 reside in the "observe" virtual layer. As described above, the SIC 208 receives measurements (e.g., sensor data) having various formats. The SIC 208 is configured to convert vendor-specific data directly from the sensors to vendor-neutral data. In this way, the set of sensors 202 can include any brand of Radar, LIDAR, image sensor, or other sensors, and the modular architecture 206 can use their perceptions of the environment effectively.

Figure 3:
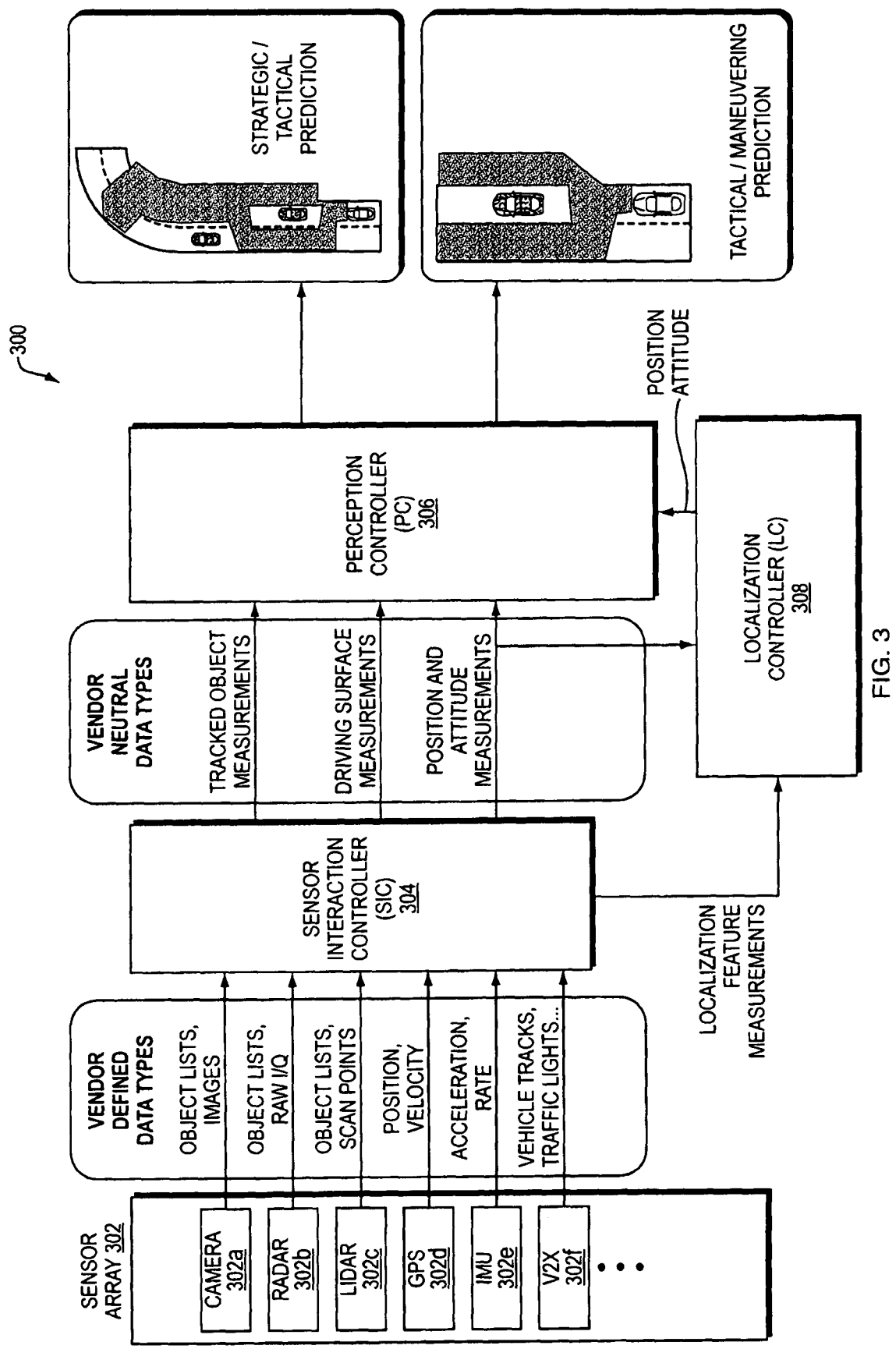
FIG. 3 is a block diagram illustrating an embodiment of the sensor interaction controller (SIC), perception controller (PC), and localization controller (LC).

The measurements output by the sensor interface server are then processed by perception controller (PC) 212 and localization controller (LC) 210. The PC 212 and LC 210 both reside in the "orient" virtual layer of the OODA model. The LC 210 determines a robust world-location of the vehicle that can be more precise than a GPS signal, and still determines the world-location of the vehicle when there is no available or an inaccurate GPS signal. The LC 210 determines the location based on GPS data and sensor data. The PC 212, on the other hand, generates prediction models representing a state of the environment around the car, including objects around the car and state of the road. FIG. 3 provides further details regarding the SIC 208, LC 210 and PC 212.

Figure 4:
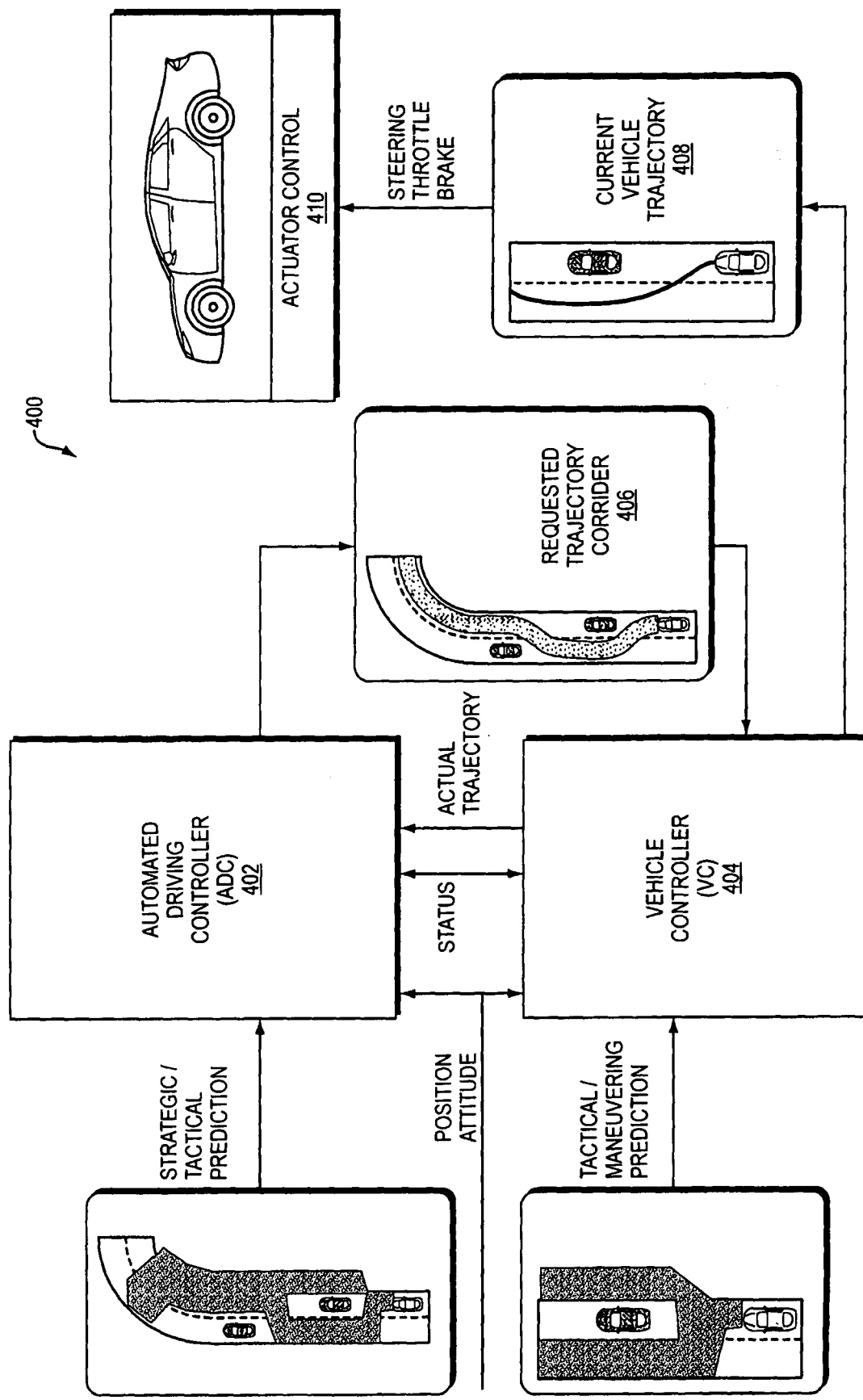
FIG. 4 is a block diagram illustrating an example embodiment of the automatic driving controller (ADC), vehicle controller (VC) and actuator controller.

Automated driving controller 214 (ADC) and vehicle controller 216 (VC) receive the outputs of the perception controller and localization controller. The ADC 214 and VC 216 reside in the "decide" virtual layer of the OODA model. The ADC 214 is responsible for destination selection, route and lane guidance, and high-level traffic surveillance. The ADC 214 further is responsible for lane selection within the route, and identification of safe harbor areas to diver the vehicle in case of an emergency. In other words, the ADC 214 selects a route to reach the destination, and a corridor within the route to direct the vehicle. The ADC 214 passes this corridor onto the VC 216. Given the corridor, the VC 216 provides lower level driving functions to direct the vehicle through the corridor safely. The VC 216 first determines the best way to maneuver through the corridor while providing comfort to the driver, an ability to reach safe harbor, emergency maneuverability, and ability to follow the vehicle's trajectory. In emergency situation, the VC 216 overrides the corridor provided by the ADC 214 and immediately guides the car into a safe harbor corridor, returning to the corridor provided by the ADC 214 when it is safe to do so. The VC 216, after determining how to maneuver the vehicle, including safety maneuvers, then provides actuation commands to the vehicle 204, which executes the commands in its steering, throttle, and braking subsystems. This element of the VC 216 is therefore in the "act" virtual layer of the OODA model. FIG. 4 describes the ADC 214 and VC 216 in further detail.

The modular architecture 206 further coordinates communication with various modules through system controller 218 (SC). By exchanging messages with the ADC 214 and VC 216, the SC 218 enables operation of human interaction controller 220 (HC) and machine interaction controller 222 (MC). The HC 220 provides information about the autonomous vehicle's operation in a human readable format based on status messages coordinated by the system controller. The HC 220 further allows for human input to be factored into the car's decisions. For example, the HC 220 enables the operator of the vehicle to enter or modify the destination or route of the vehicle, as one example. The SC 218 interprets the operator's input and relays the information to the VC 216 or ADC 214 as necessary.

Further, the MC 222 can coordinate messages with other machines or vehicles. For example, other vehicles can electronically and wirelessly transmit turn signals to autonomous vehicles, and the MC 222 can receive such information, and relay it to the VC 216 and ADC 214 via the SC 218. In addition, the MC 222 can send information to other vehicles wirelessly. In the example of a turn signal, the MC 222 can receive a notification that the vehicle intends to turn. The MC 222 receives this information via the VC 216 sending a status message to the SC 218, which relays the status to the MC 222. However, other examples of machine communication can also be implemented. For example, other vehicle sensor information or stationary sensors can wirelessly send data to the autonomous vehicle, giving the vehicle a more robust view of the environment. Other machines may be able to transmit information about objects in the vehicles blind spot, for example. In further examples, other vehicles can send their vehicle track. In an even further example, traffic lights can send a digital signal of their status to aid in the case where the traffic light is not visible to the vehicle. A person of ordinary skill in the art can recognize that any information employed by the autonomous vehicle can also be transmitted to or received from other vehicles to aid in autonomous driving.

FIG. 3 is a block diagram 300 illustrating an embodiment of the sensor interaction controller 304 (SIC), perception controller (PC) 306, and localization controller (LC) 308. A sensor array 302 of the vehicle can include various types of sensors, such as a camera 302a, radar 302b, LIDAR 302c, GPS 302d, IMU 302e, or vehicle-to-everything (V2X) 302f. Each sensor sends individual vendor defined data types to the SIC 304. For example, the camera 302a sends object lists and images, the radar 302b sends object lists, and in-phase/quadrature (IQ) data, the LIDAR 302c sends object lists and scan points, the GPS 302d sends position and velocity, the IMU 302e sends acceleration data, and the V2X 302f controller sends tracks of other vehicles, turn signals, other sensor data, or traffic light data. A person of ordinary skill in the art can recognize that the sensor array 302 can employ other types of sensors, however. The SIC 304 monitors and diagnoses faults at each of the sensors 302a-f. In addition, the SIC 304 isolates the data from each sensor from its vendor specific package and sends vendor neutral data types to the perception controller (PC) 306 and localization controller 308 (LC). The SIC 304 forwards localization feature measurements and position and attitude measurements to the LC 308, and forwards tracked object measurements, driving surface measurements, and position & attitude measurements to the PC 306. The SIC 304 can further be updated with firmware so that new sensors having different formats can be used with the same modular architecture.

The LC 308 fuses GPS and IMU data with Radar, Lidar, and Vision data to determine a location in GPS location, and to increase the precision of the GPS location. The LC 308 then reports that robust determined location, velocity, and attitude to the PC 306. The LC 308 further monitors measurements representing position, velocity, and attitude data for accuracy relative to each other, such that if one sensor measurement fails or becomes degraded, such as a GPS signal in a city, the LC 308 can correct for it. The PC 306 identifies and locates objects around the vehicle based on the sensed information. The PC 306 further estimates drivable surface regions surrounding the vehicle, and further estimates other surfaces such as road shoulders or drivable terrain in the case of an emergency. The PC 306 further provides a stochastic prediction of future locations of objects. The PC 306 further stores a history of objects and drivable surfaces.

The PC 306 outputs two predictions, a strategic prediction, and a tactical prediction. The tactical prediction represents the world around 2-4 seconds into the future, which only predicts the nearest traffic and road to the vehicle. This prediction includes a free space harbor on shoulder of the road or other location.

The strategic prediction is a long-term prediction that predicts areas of the car's visible environment beyond the visible range. This prediction is for greater than four seconds into the future, but has a higher uncertainty than the tactical prediction because objects (e.g., cars and people) may change their currently observed behavior in an unanticipated manner. The strategic prediction has higher uncertainty because it assumes that currently observed behavior continues for the entire prediction period. Such a prediction can also be based on sensor measurements from external sources including other autonomous vehicles, manual vehicles with a sensor system and sensor communication network, sensors positioned near or on the roadway or received over a network from transponders on the objects, and traffic lights, signs, or other signals configured to communicate wirelessly with the autonomous vehicle.

FIG. 4 is a block diagram 400 illustrating an example embodiment of the automatic driving controller (ADC) 402, vehicle controller (VC) 404 and actuator controller 410. The ADC 402 and VC 404 execute the "decide" virtual layer of the CODA model.

The ADC 402, based on destination input by the operator and current position, first creates an overall route from the current position to the destination including a list of roads and junctions between roads to reach the destination. This strategic route plan may be based on traffic conditions, and can change based on updating traffic conditions, however such changes are generally enforced for large changes in estimated time of arrival (ETA). Next, the ADC 402 plans a safe, collision-free, corridor for the autonomous vehicle to drive through based on the surrounding objects and permissible drivable surface—both supplied by the PC. This corridor is continuously sent as a request to the VC 404 and is updated as traffic and other conditions change. The VC 404 receives the updates to the corridor in real time. The ADC 402 receives back from the VC 404 the current actual trajectory of the vehicle, which is also used to modify the next planned update to the driving corridor request.

The ADC 402 generates a strategic corridor for the vehicle to navigate. The ADC 402 generates the corridor based on predictions of the free space on the road in the strategic/tactical prediction. The ADC 402 further receives the vehicle position information and vehicle attitude information from the perception controller of FIG. 3. The VC 404 further provides the ADC 402 with an actual trajectory of the vehicle from the vehicle's actuator control 410. Based on this information, the ADC 402 calculates feasible corridors to drive the road. In the example of being on an empty road, the corridor may follow the lane ahead of the car.

In another example of the car needing to pass out a car, the ADC 402 can determine whether there is free space in a passing lane and in front of the car to safely execute the pass. The ADC 402 can automatically calculate based on (a) the current distance to the car to be passed, (b) amount of drivable road space available in the passing lane, (c) amount of free space in front of the car to be passed, (d) speed of the vehicle to be passed, (e) current speed of the autonomous vehicle, and (f) known acceleration of the autonomous vehicle, a corridor for the vehicle to travel through to execute the pass maneuver.

In another example, the ADC 402 can determine a corridor to switch lanes when approaching a highway exit. In addition to all the above factors, the ADC 402 monitors the planned route to the destination and, upon approaching a junction, calculates the best corridor to safely and legally continue the planned route.

The ADC 402 further calculates a tactical trajectory within the corridor, which allows the vehicle to maintain a safe separation between objects. The tactical trajectory also includes a backup safe harbor trajectory in the case of an emergency, such as a vehicle unexpectedly decelerating or stopping, or another vehicle swerving in front of the autonomous vehicle.

The ADC 402 the provides the requested trajectory corridor 406 to the VC 404, which works in tandem with the ADC 402 to allow the vehicle to navigate the corridor. The requested trajectory corridor 406 places geometric and velocity constraints on trajectory for a number of seconds into the future. The VC 404 determines a route to maneuver within the corridor 406. The VC 404 bases its maneuvering decisions from the tactical/maneuvering prediction received from the perception controller and the position of the vehicle and the attitude of the vehicle. As described previously, the tactical/maneuvering prediction is for a shorter time period, but has less uncertainty. Therefore, for lower-level maneuvering and safety calculations, the VC 404 effectively uses the tactical/maneuvering prediction to plan collision-free trajectories within requested corridor 406. As needed in emergency situations, the VC 404 plans trajectories outside the corridor 406 to avoid collisions with other objects.

The VC 404 then determines, based on the requested corridor 406, the current velocity and acceleration of the car, and the nearest objects, how to drive the car through that corridor 406 while avoiding collisions with objects and remain on the drivable surface. As necessary to avoid collisions, the VC 404 may be required to command a maneuver suddenly outside of the requested corridor from the ADC 402. This emergency maneuver can be initiated entirely by the VC 404 as it has faster response times than the ADC 402 to imminent collision threats. This capability isolates the safety critical collision avoidance responsibility within the VC 404. The VC 404 sends maneuvering commands to the actuators that control steering, throttling, and braking of the vehicle platform.

The VC 404 executes its maneuvering strategy by sending a current vehicle trajectory 408 having driving commands (e.g., steering, throttle, braking) to the vehicle's actuator controls 410. The vehicle's actuator controls 410 apply the commands to the car's respective steering, throttle, and braking systems. The VC 404 sending the trajectory 408 to the actuator controls represent the "Act" virtual layer of the CODA model. By conceptualizing the autonomous vehicle architecture in this way, the VC is the only component needing configuration to control a specific model of car (e.g., format of each command, acceleration performance, turning performance, and braking performance), whereas the ADC remaining highly agnostic to the specific vehicle capacities. In an example, the VC 404 can be updated with firmware configured to allow interfacing with particular vehicle's actuator control systems, or a fleet-wide firmware update for all vehicles.

Figure 5:
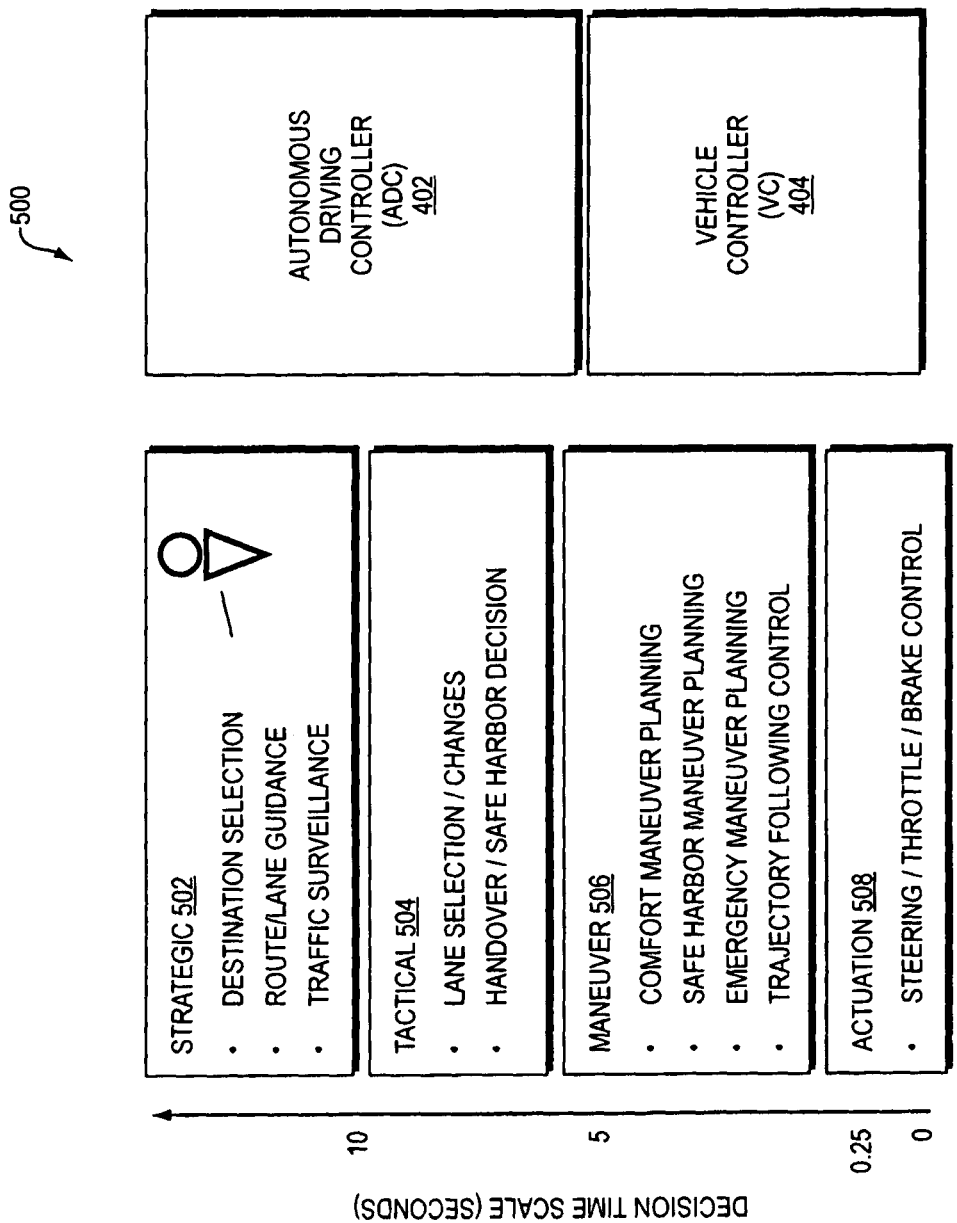
FIG. 5 is a diagram illustrating decision time scales of the ADC and VC.

FIG. 5 is a diagram 500 illustrating decision time scales of the ADC 402 and VC 404. The ADC 402 implements higher-level, strategic 502 and tactical 504 decisions by generating the corridor. The ADC 402 therefore implements the decisions having a longer range/or time scale. The estimate of world state used by the ADC 402 for planning strategic routes and tactical driving corridors for behaviors such as passing or making turns has higher uncertainty, but predicts longer into the future, which is necessary for planning these autonomous actions. The strategic predictions have high uncertainty because they predict beyond the car's visible range, relying solely on non-vision technologies, such as Radar, for predictions of objects far away from the car. Many tactical decisions, such as passing a car at highway speed, require perception Beyond the Visible Range (BVR) of an autonomous vehicle (e.g., 100m or greater), whereas all maneuverability 506 decisions are made based on locally perceived objects to avoid collisions.

The VC 404, on the other hand, generates maneuverability decisions 506 using maneuverability predictions that are short time frame/range predictions of object behaviors and the driving surface. These maneuverability predictions have a lower uncertainty because of the shorter time scale of the predictions, however, they rely solely on measurements taken within visible range of the sensors on the autonomous vehicle. Therefore, the VC 404 uses these maneuverability predictions (or estimates) of the state of the environment immediately around the car for fast response planning of collision-free trajectories for the autonomous vehicle. The VC 402 issues actuation commands, on the lowest end of the time scale, representing the execution of the already planned corridor and maneuvering through the corridor.

Figure 6:
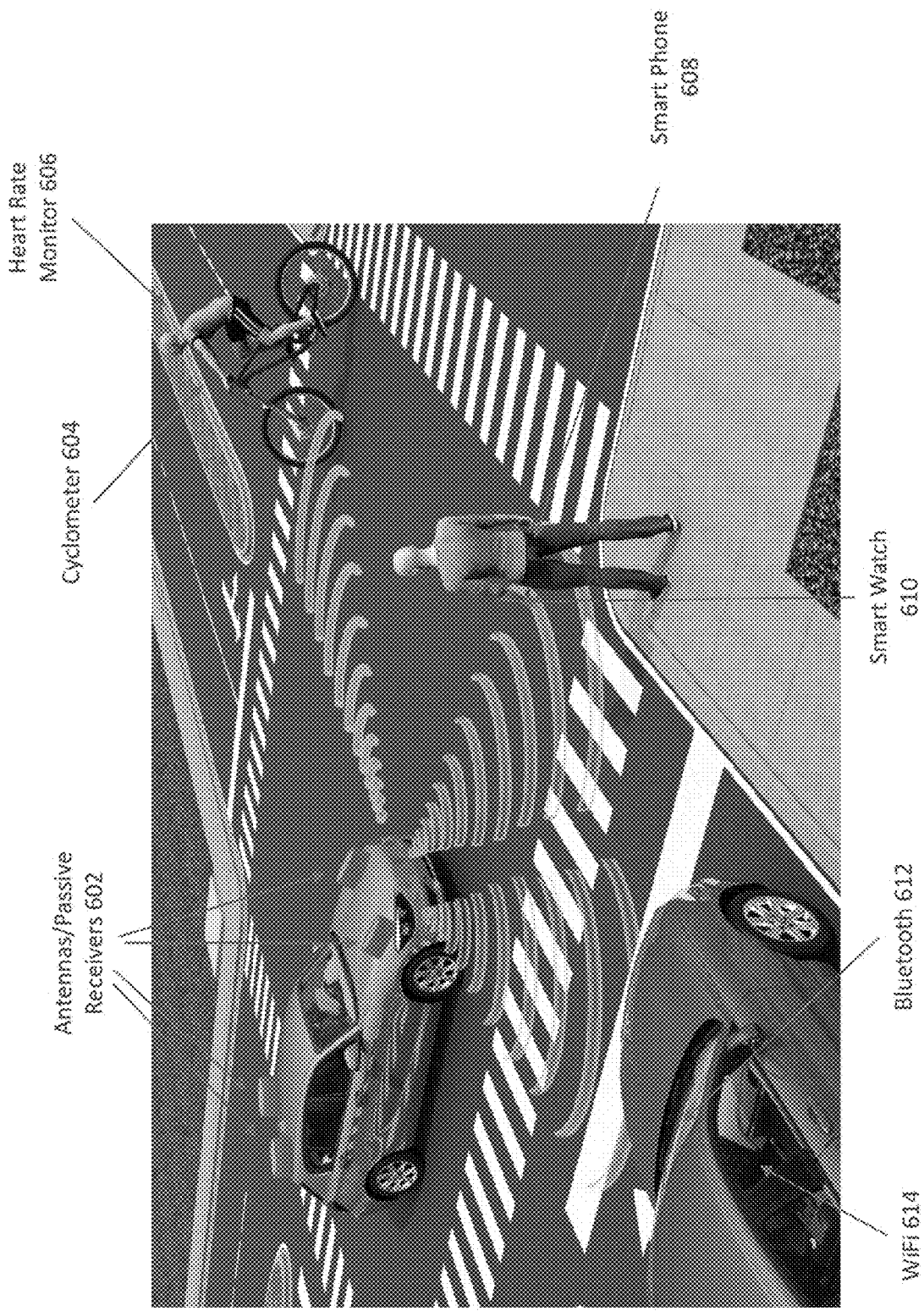
FIG. 6 is a diagram illustrating an example embodiment of the system and method of the present disclosure.

FIG. 6 is a diagram 600 illustrating an example embodiment of the system and method of the present disclosure. It can be advantageous for a highly automated vehicle to replicate the human ability of detecting objects to navigate a corridor/roadway safely. To that end, highly automated vehicles employ combinations of cameras, lidars, radars, and acoustic/ultrasonic sensors, among others. However, additional reference points of the real world can increase the reliability of the highly automated vehicle's perception of the world around it. In addition, humans, cyclists, and other drivers commonly carry electronic devices or bring electronic devices into their vehicles.

In an embodiment of the present disclosure, a platform can detect the presence of RF signals relative to the platform. In an embodiment, the platform can be a highly automated vehicle, however, it need not be limited to such an application.

A previous solution detailed in Sun et al., "Enhancing autonomous vehicle perception with off-vehicle collected data," U.S. Pat. No. 10,101,745 (hereinafter "the '745 patent") received location and other digital data from devices to determine a location of an object near a vehicle, for example. The '745 patent is directed to a system that actively receives digital data such as a GPS location from remote devices. In contrast, Applicant's disclosure detects the presence of RF emissions, agnostic of the data transmitted in those emissions. In certain cases, Applicant's disclosure detects RF emissions such as the background emissions of a processor. Detection of the presence of those emissions without needing to detect any transmitted data can be important information to determining the location of an object, especially in a highly automated driving scenario.

Such a system can work in concert with other sensors (e.g., sensors 202 of FIG. 2, sensor array 302 of FIG. 3, etc.), but provides other advantages. Detecting RF radiation can detect objects in a scenario where network connectivity is down (e.g., with tall buildings, rural areas, an outage, etc.) where the '745 patent may receive inaccurate data. Further, RF radiation can improve location data detected by cameras, lidars, radars, acoustic/ultrasonic sensors by fusing another point of reference. The RF data can further be filtered to determine object type, trajectory, and location, and a fusion module can merge that information with other data collected from other sensors.

In a vehicle context, existing vehicle hardware can be repurposed for detecting RF signals. For example, most modern cars are equipped with a Tire Pressure Monitoring Sensor (TPMS) at each wheel. A person having ordinary skill in the art can recognize that a car TPMS enabled is equipped with four TPMS sensors that are each configured to detect tire pressure of each respective tire of the car, and radio the data to the antennas mounted on the car itself. The TPMS antennas can be configured and positioned to receive RF emissions data as well.

Embodiments of Applicant's disclosure can further differentiate from different types of RF signals. For example, cell phones are known to have certain RF patterns, such as handshaking with a tower. Cell phones send handshake data to towers to maintain their connection, and can handshake every 5 seconds to 1 minute. Cell phones that are actively in a call or receiving or transmitting data can also be detected. As another example, unintended emissions can be detected. Processors of computers are radiating RF emissions constantly. Even further, devices that are connected locally via WiFi (e.g., a vehicle's WiFi modem) or Bluetooth can be detected. Some cars further transmit other RF emissions such as cellular transmissions and TPMS transmissions. Applicant's system can detect for all of these examples of RF emissions simultaneously. Further, Applicant's system can differentiate between two simultaneous signals with signal separation techniques and also by determining the type of signal being detected.

In an autonomous car context, the range and bearing of a tracked object can be fused with other sensor data (e.g., radar/lidar/camera objects/foresight objects detected based on digital data) at the perception module. Like radar outputs, the interferometry output data of the present disclosure provides a range, direction and bearing of the object even though the type of object is unknown. Associating its track with data from other sensors (e.g., lidar, stereo vision) can resolve this ambiguity. While high range uncertainty makes interferometry a secondary modality for tracking, it has the benefit of early warning of visually hidden objects.

Applicant's disclosure can also be applied to a flighted vehicle as an airborne collision early warning system in autonomous or piloted aircraft or drones. Practically the method of the present disclosure employs antennas with minimum physical spacing, and therefore can be implemented with existing commercial aircraft and to warn about nearby small drones emitting RF signals, for example. In one embodiment, the RF signal can be the sole modality for tracking, which provides an advantage because some small drones are not detected by aircraft radar and are hard to see with vision systems or the human eye. In such an embodiment, the present invention can avoid an otherwise undetected small object.

In another embodiment, the methods of the present disclosure can fuse interferometry data with radar/vision or sole modality for tracking. Such a fusion of data is beneficial because small drones may not appear on many radars in aircraft and are to see visually. While RF interferometry can have a range uncertainty, in an airborne early warning context, the uncertainty is less important because the airplane simply needs to avoid the bearing of the object emitting RF. The interferometry alone cannot identify the tracked object, but in an airborne embodiment, the identity of the object is not necessary because any object flying near the plane or drone emitting RF should be avoided. Applicant's method can track any airborne object with an RF emitter, including very small drones that emit to ground control stations (e.g., smartphones) because it relies on passive RF data.

In another embodiment, Applicant's method could be used to let an autonomous system (e.g., a robot or robotic arm) point towards a given emitter because interferometry performs better with angular bearing measurements than range measurements. For example, existing robotics project have robots following a squad of soldiers using image recognition and a process called "visual servoing." When visual conditions are obscured (e.g., smoke, fog, rain, other visual interference) or even darkness/nighttime, visual recognition alone is difficult. Therefore, RF interferometry can supplement a robotic system by allowing the robot to continue to follow designated people that have RF emitting objects. Such a robot can be used in military, first-responder (e.g., firefighting, SWAT teams) contexts. Interferometry is not affected by the visual conditions, so the weather does not affect this technology.

In an embodiment, Applicant's disclosure can also track a specific RF emitter by tracking unique RF signal properties that discriminate emitters from each other.

A plurality of antennas/passive receivers 602 (e.g., TPMS antennas) are mounted on a platform, such as a vehicle. The vehicle can be a manually operated vehicle, semi-automated vehicle, or highly automated vehicle. The antennas/passive receivers 602 detect radio-frequency (RF) signals of various kinds. Processors coupled with the receivers 602 do not analyze the RF signals for their content or data, but rather for properties of the RF signals themselves (e.g., amplitude and phase). By detecting properties of the RF signals at a plurality of passive receivers 602 having known positions on the platform, phase, amplitude, or both can be analyzed to determine a position of a source of the RF signal relative to the platform/receivers 602. A person having ordinary skill in the art can recognize that such a system can be characterized as a physical layer tracking (PLT) system, in that it observes and analyzes the physical properties of the RF or EM emissions without analyzing any digital or analog signal of those emissions.

RF signals can be emitted by various electronic devices, such as a cyclometer 604, heart rate monitor 606, smart phone 608, smart watch 608, Bluetooth radio 612, or WiFi radio 614. Other electronic devices can also be detected, however. A person having ordinary skill in the art can recognize that the electronic device need not emit a wireless communications protocol (e.g., 4G, WiFi, Bluetooth, etc.) to be detected by the receivers 602. For example, background emissions from a processor or other electronic component can also be detected.

Figure 7:
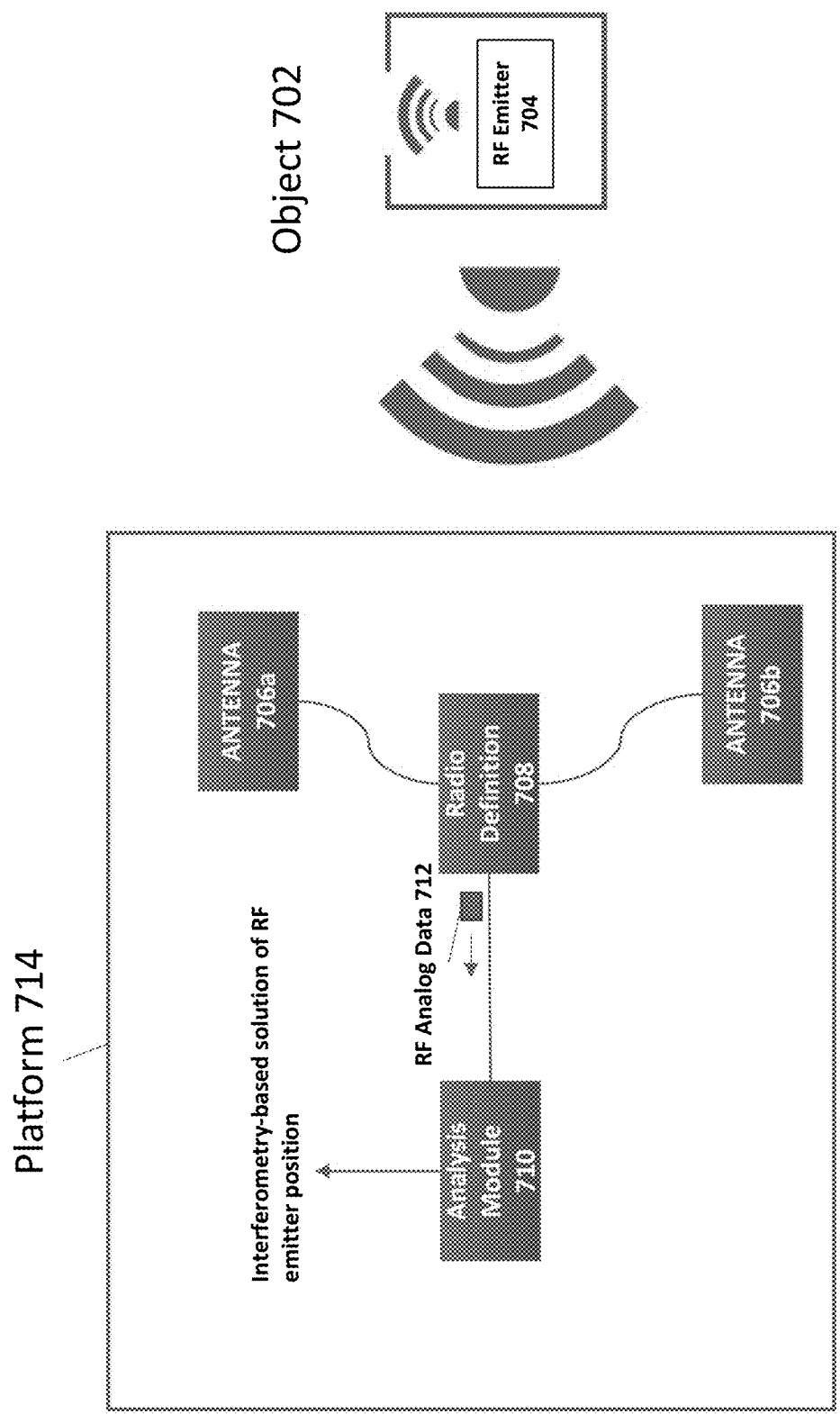
FIG. 7 is a block diagram illustrating an example embodiment of the system and method of the present disclosure.

FIG. 7 is a block diagram 700 illustrating an example embodiment of the system and method of the present disclosure. An object 702 carries, is attached to, or is otherwise associated with an RF emitter 704. Antennas 706*a-b* detect RF signals from the RF emitter 704 and a radio definition module 708 (e.g., ETTUS™ N310 Software Defined Radio) converts the raw RF signals collected by the antennas 706*a-b* to RF Analog Data 712. An analysis module 710 then determines an interferometry-based solution of the RF Emitter 704/object 702 position. Examples of such interferometry-based techniques include signal separation, homodyne and heterodyne detection, and time distance of arrival (TDOA) location determination.

A person having ordinary skill in the art can recognize that in embodiments, the array of antennas 706*a-b* can include two or more antennas. The configuration of the system can vary as the number of antennas 706*a-b* change. In the present disclosure, however, Applicant describes a system having four antennas, which can be configured as described below.

Figure 8:
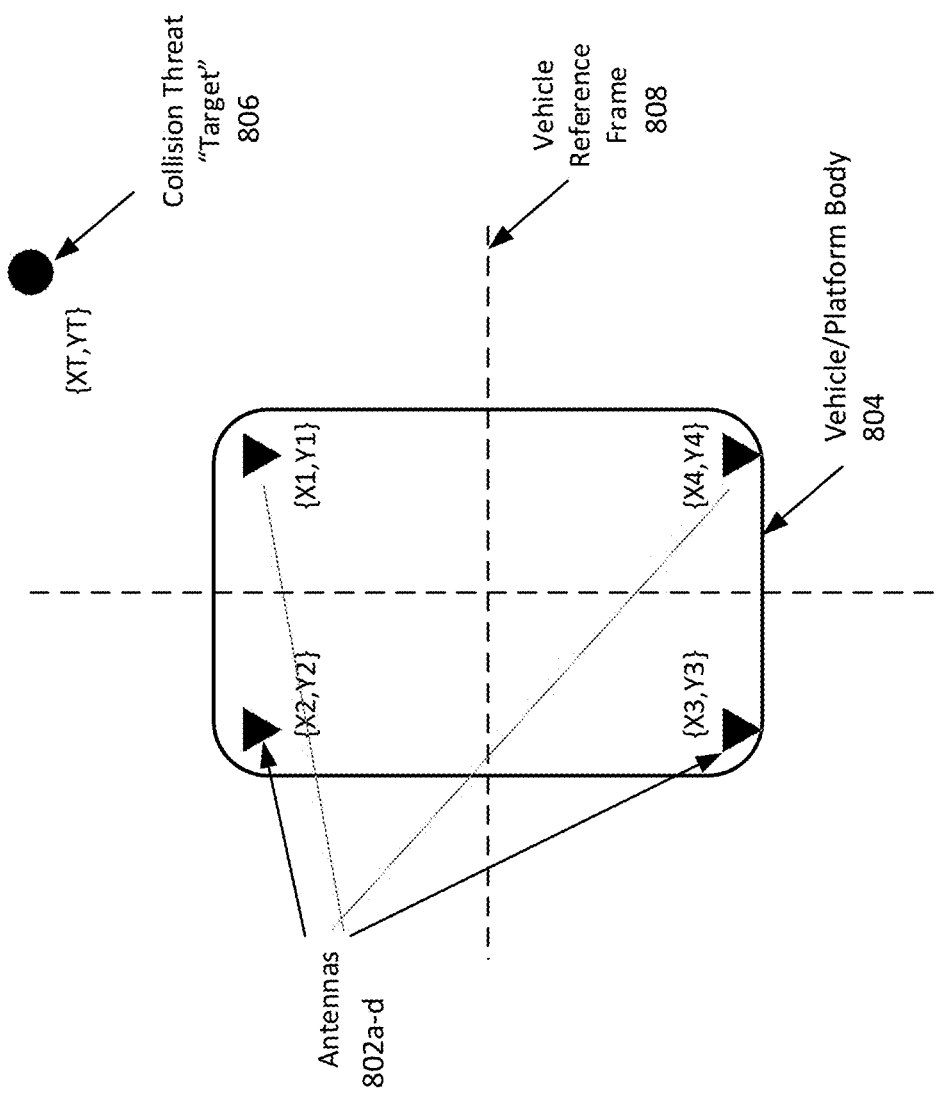
FIG. 8 is a diagram illustrating a coordinate scheme employed by the system to determine the location of a target based on a data received at a group of antennas.

FIG. 8 is a diagram 800 illustrating a coordinate scheme employed by the system to determine the location of a target based on a data received at a group of four antennas 802*a-d*. Antennas 802*a-d* are mounted at known coordinates on a vehicle/platform body 804. For example, antenna 802*a* is mounted at $\{X1,Y1\}$, antenna 802*b* is mounted at $\{X2,Y2\}$, antenna 802*c* is mounted at $\{X3,Y3\}$, and antenna 802*d* is mounted at $\{X4,Y4\}$. The respective coordinates are in reference to a vehicle reference frame 808, and are measured to cm-class accuracy in an embodiment, but can be measured to other precisions in other embodiments based on the precision required. In this example, the origin of the vehicle reference frame 808 is the center of the vehicle platform/body 804, however, a person having ordinary skill in the art can recognize that the antennas 802*a-d* can be placed in any location in the vehicle reference frame as long as their position is known relative to each other. A person having ordinary skill in the art can further recognize that other numbers of antennas can be used.

A target 806 is at position $\{X_T,Y_T\}$, the values of which are unknown. Applications of the present disclosure discover the coordinates of $\{X_T,Y_T\}$ based on the RF observations at each antenna 802*a-d*. The antennas 802*a-d* are fully integrated through electronic calibration and compensation. The output of the antennas 802*a-d* are routed to a centrally-located four channel, synchronous-sampling software radio, such as the Ettus™ N310 (not shown). Synchronous sampling eliminates receiver considerations in timing accuracy.

In an example system, the target 806 is uncooperative, and may be any of the different types of wireless devices commonly found in the environment. In a laboratory setting, a target 806 is a signal generator producing pulsed transmissions of similar construction to the frame sync used in LTE. A reasonable stand-in would be a 1 millisecond (ms) burst of any of the standard Gold codes, transmitted at 1800 MHz, once per second. In a real-world setting, the target is any of these different types of electronic devices.

Figure 9:
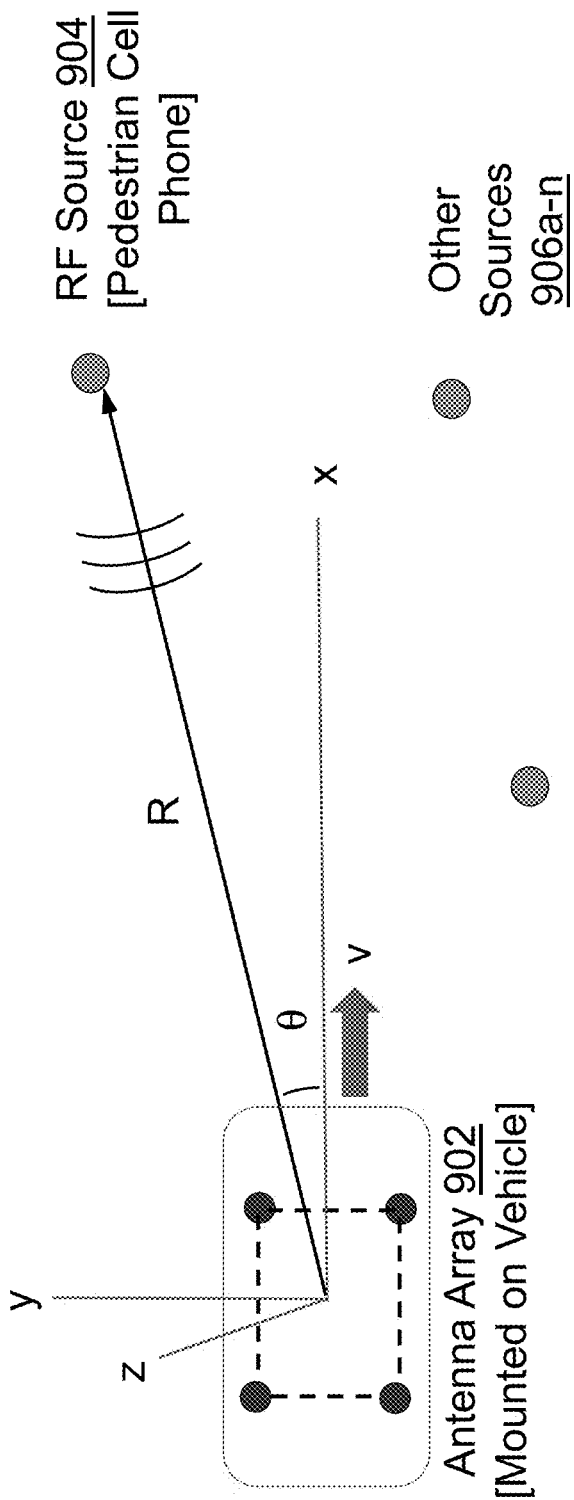
FIG. 9 is a diagram illustrating an example embodiment of the system and method of the present disclosure.

FIG. 9 is a diagram 900 illustrating an example embodiment of the system and method of the present disclosure. FIG. 9 illustrates a different view of Applicant's platform relative to the RF source 904. As described above, Applicant's system is configured to locate one or more sources based on their RF emissions. In one application, pedestrians or other objects on a roadway can be localized with respect to a vehicle.

Pedestrians can carry cell phones that emit RF energy on a regular basis. The emissions can be 4G LTE, WiFi, or self-emissions (e.g., background processor emissions). As an example, 4G LTE uplink traffic is explored with relation to FIG. 9. As also shown in relation to FIGS. 6 and 8, FIG. 9 illustrates an antenna array 902 having four antennas mounted on a vehicle or other platform. The antenna array receives RF signals from an RF source 904 (e.g., a pedestrian cell phone). For a two-dimensional (2D) solution, an cartesian (x,y) or polar (R, θ) position of the RF source 904 can be determined. An exemplary range of the system is 100 meters. After receiving the signals, a processing method calculates the location of the RF source 904, as described further in relation to FIG. 10.

Figure 10:
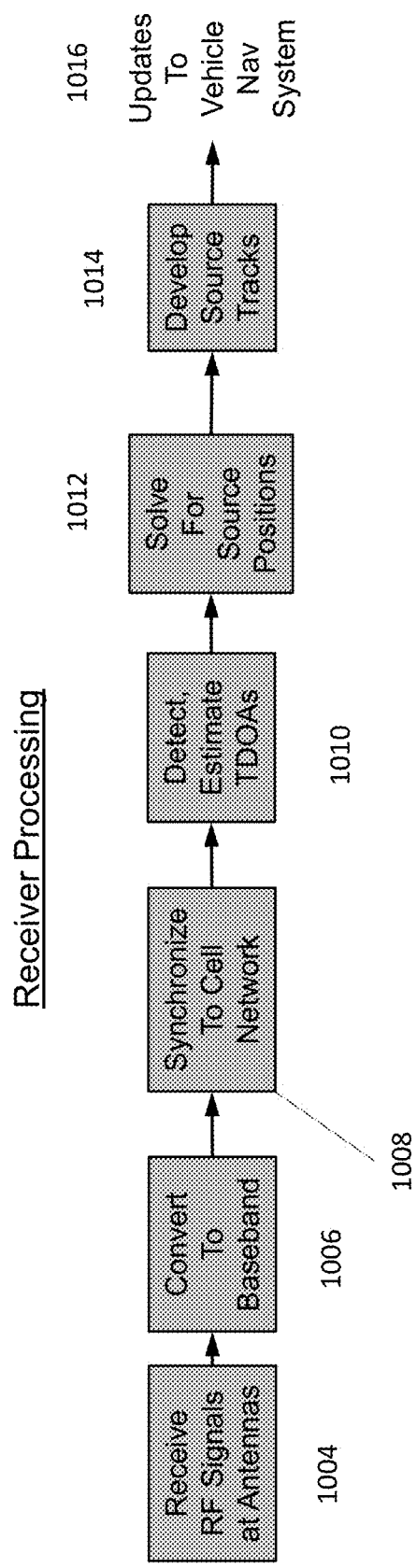
FIG. 10 is a flow diagram illustrating an example embodiment of processing employed by a receiver in the present disclosure.

FIG. 10 is a flow diagram 1000 illustrating an example embodiment of processing employed by a receiver in the present disclosure. RF signals are received at antennas (1004). The RF signals are converted to baseband (1006). The baseband signals are then compared to synchronization signals from a cellphone network (1008). Comparing the baseband signals to a model synchronization signal allows, for example, a distance of the RF signal source to be calculated based on a deviation of the amplitude of the baseband signals to the model synchronization signal. Then, the method detects and estimates the time distance of arrivals with respect to each antenna pair in the array of antennas (1010). Example of a time distance of arrival analysis in the context of the present system is shown in relation to FIG. 12 and its description below. In relation to FIG. 10, a processing module then solves for source positions x(t) and y(t) (1012). As positions are detected over time, source tracks of objects can be developed (1014). Then, the source tracks (or source positions) can update the vehicle navigation system (1016) (e.g., through an object fusion module).

A person having ordinary skill in the art can recognize that the above method can detect multiple RF sources within RF range of the platform based on factors including TDOA, signal amplitude, signal frequency, or other signal characteristics. For example, cell operators (e.g., Verizon®, AT&T®, Sprint®) may use different frequency bands spanning cell operators in an area, and can be differentiated based on those frequency bands, or other information such as handshaking. In most of the world, cell phone frequency bands are in the range of 700-800 MHz and 1700-1900 MHz, with uplink bandwidths of 1.4, 3, 4, 10, 15, and 20 MHz possible. Examples of a sample signal as received at the different antenna of Applicant's system are illustrated in FIG. 11.

FIG. 11 is a diagram 1100 illustrating example embodiments of a waveform as received at each of a plurality of antennas. For simplicity, the illustrated waveform is identical except for phase as received at each antenna, but a person having ordinary skill in the art can recognize that attributes such as amplitude may change in the real-world. Antenna 1 receives the waveform with its peak at time t=0. Antenna 2 receives the waveform with its peak being offset by $T=T_{21}$, where $T_{21}$ represents the time elapsed from T=0 to when Antenna 2 received the waveform. Antenna 3 receives the waveform with its peak being offset by $T=T_{31}$, where $T_{31}$ represents the time elapsed from T=0 to when Antenna 3 received the waveform. Antenna 4 receives the waveform with its peak being offset by $T=T_{41}$, where $T_{41}$ represents the time elapsed from T=0 to when Antenna 4 received the waveform. A person having ordinary skill in the art can recognize that other TDOAs can be calculated, for example, $T_{23}$ (not shown) being the time between the peak of the waveform being received at Antennas 2 and 3.

Detection and tracking is based on TODA because the target emitter is considered non-cooperative. In theory, a perfect a priori knowledge of the emitter waveform can be assumed. A custom match filter processes correlation of the detected signals, with the Doppler shift and complex rotation presently treated as nuisance parameters. Doppler and static rotation may later be leveraged to, for example, track dynamics, or feed recursive processing. Once relative timing recovery is accomplished, the system generates the relevant TDOAs (e.g., $T_{21}$, $T_{31}$ and $T_{41}$).

In the real-world, a perfect a priori knowledge of the emitter waveform is not available. In these cases, to estimate the waveform, a copy of the waveform received first and at the closest antenna (e.g., the earliest and loudest/highest amplitude) is used as a reference, and then the system computes the complex cross-correlation against the remaining receiver channels to estimate the sufficient statistics. It can be assumed that the signal degrades or changes minimally as it travels across the platform/vehicle.

In the real-world, the system simultaneously tracks multiple emitters by employing signal separation techniques (e.g., channelization) prior to tracking the individual emitters. After signal separation, the location of the source can be calculated, for example, by the relationships illustrated in FIG. 12.

FIG. 12 is a diagram 1200 illustrating an example embodiment of calculating position of an object. The source location of the RF emitter can be determined by solving a set of nonlinear simultaneous equations, as shown below:

$$\sqrt{(X_2-X_T)^2+(Y_2-Y_T)^2} - \sqrt{(X_1-X_T)^2+(Y_1-Y_T)^2} = c*T_{21}$$

$$\sqrt{(X_3-X_T)^2+(Y_3-Y_T)^2} - \sqrt{(X_1-X_T)^2+(Y_1-Y_T)^2} = c*T_{21}$$

$$\sqrt{(X_4-X_4)^2+(Y_2-Y_T)^2} - \sqrt{(X_1-X_T)^2+(Y_1-Y_T)^2} = c*T_{21}$$

Figure 13B:
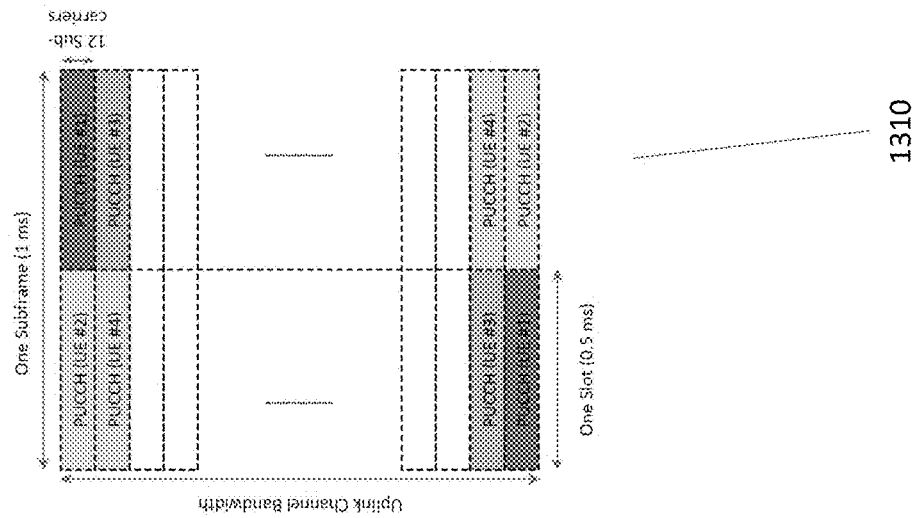
FIGS. 13A-B are diagrams illustrating an example embodiment of frames of RF transmissions.
Figure 13A:
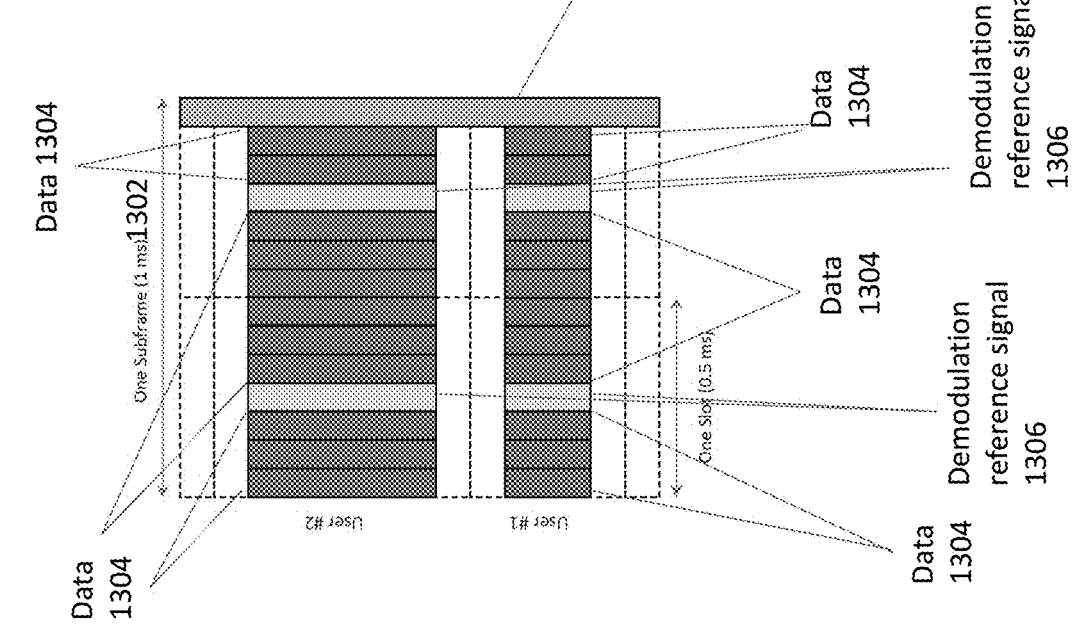

The variables $X_{1-4}$ and $Y_{1-4}$ are the known respective X and Y coordinates for each antenna 1-4. $T_{21}$, $T_{31}$, and $T_{41}$ are the known respective TDOAs between Antennas 2 and 1, 3 and 1, and 4 and 1, respectively. $X_T$ and $Y_T$ are unknown variables that need to be solved, however. The method further assumes that the coordinates of the RF emitter $X_T$, $Y_T$ are within a quadrant closest to the antenna that receives the signal first (e.g., Antenna 1 with respect to FIG. 11). To separate signals and perform the above calculations, it can be helpful to have a priori knowledge of the formats of wireless emissions that may be detected. FIGS. 13A-B illustrate examples of such formats.

FIG. 13A is a diagram 1300 illustrating an example embodiment of frames of RF transmissions. Subframe 1302 is 1 ms long and illustrates data 1304, demodulation reference signals 1306, and a sounding reference signal 1308. The subframe 1302 includes two 0.5 ms slots.

FIG. 13B is a diagram 1310 illustrating an example physical uplink graph of an uplink channel bandwidth and respective subframes and slots. The physical uplink graph 1310 shows Physical Uplink Control Channel (PUCCH) data for different user equipment (UEs 1-4).

The LTE standard allocates transmit resources to users over one or more resource blocks of 180 KHz, with transmit times of 1 ms. The LTE standard further provides additional known reference signals to aid in demodulation. For example, PUCCH Data channel includes multiple 180 kHz×1 msec blocks. A PUCCH Control channel includes two sequential 180 kHz×0.5 msec blocks, at opposite ends of channel band. Except when the device is actively used as a phone, the control channel is most likely to be observed. However, other patterns can be recognized from the RF emitter.

Figure 14:
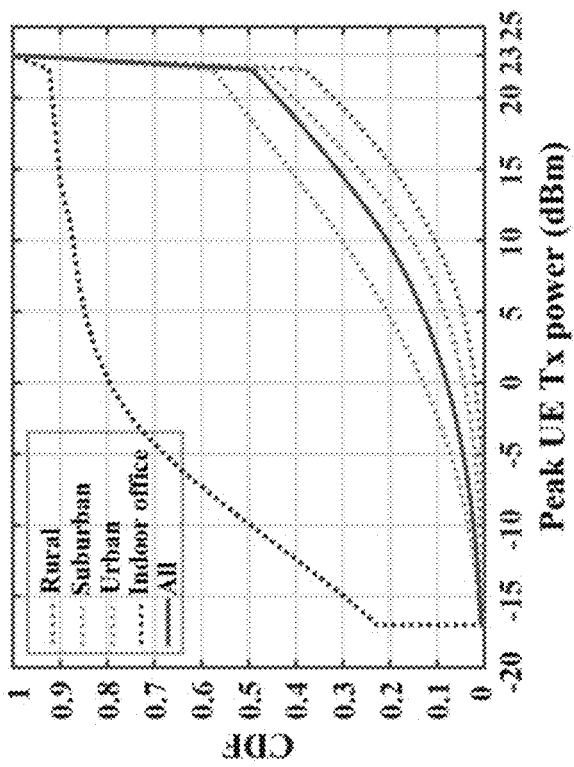
FIG. 14 is a graph illustrating an example embodiment of output levels of 4G from a UE compared to a cumulative distributive function (CDF).

In addition to recognizing the patterns of transmission, it can be helpful to know a priori the output levels of given wireless formats. FIG. 14 illustrates example output levels.

FIG. 14 is a graph 1400 illustrating an example embodiment of output levels of 4G from a UE compared to a cumulative distributive function (CDF). The maximum power level of the LTE standard is 23 dBm (200 mW). UEs are disadvantaged compared to Base Stations (eNB). For example, power levels of UE v. eNBs in LTE are 23 v. 43 dBm, antenna gains of UE v. eNB are 0 v. 18 dBi, and noise figure of UEs v. eNB are 7 dB v. 2 dB.

Therefore, a person having ordinary skill in the art can assume that UEs typically transmit at maximum power. Downlink and uplink have same path loss, but uplinks have lower transmit power, less gain, and higher receiver noise. This leads to lower data rates, where transmit power is only variable. The graph illustrated in FIG. 14 illustrates this assumption in a study with 7000 UEs and 41 eNBs. While FIG. 14 illustrates examples of transmit power, FIGS. 15A-B illustrate relationships regarding received signal power.

Figure 15A:
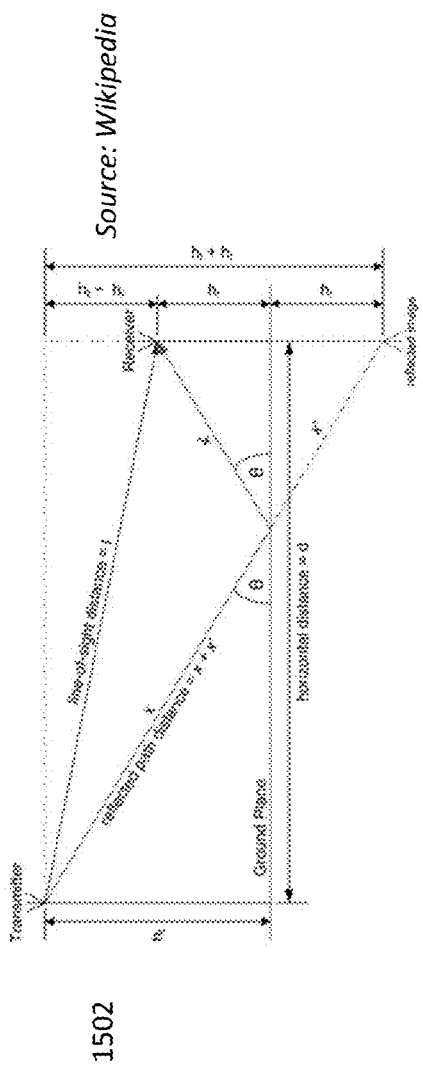
FIGS. 15A-B are graphs illustrating received signal power.
Figure 15B:
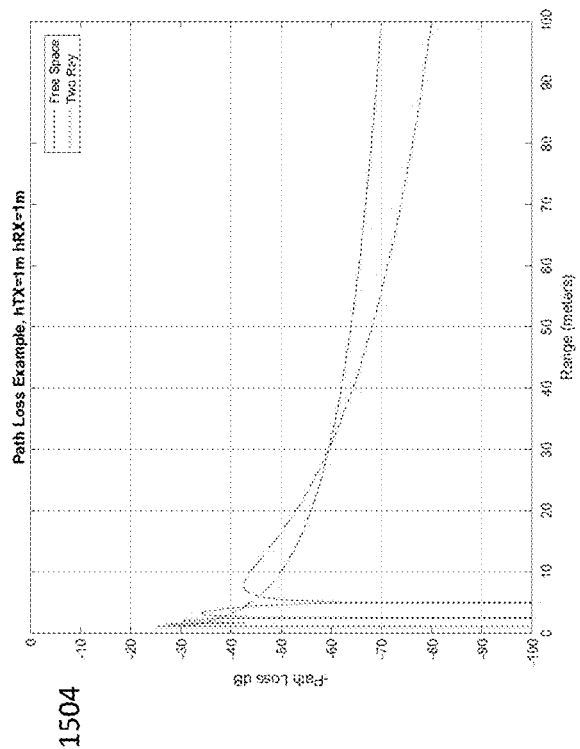
Figures 16A, 16B:
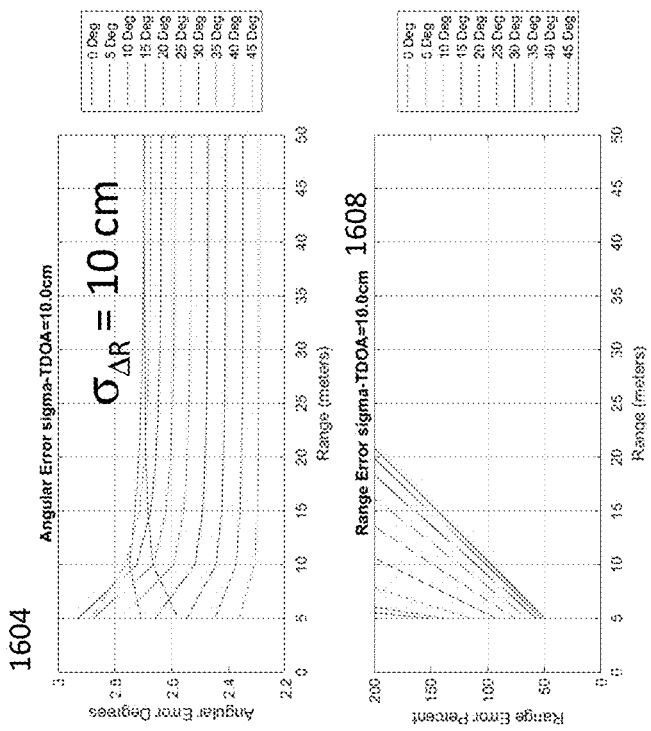
FIGS. 16A-D are graphs illustrating error ranges.
Figures 16C, 16D:
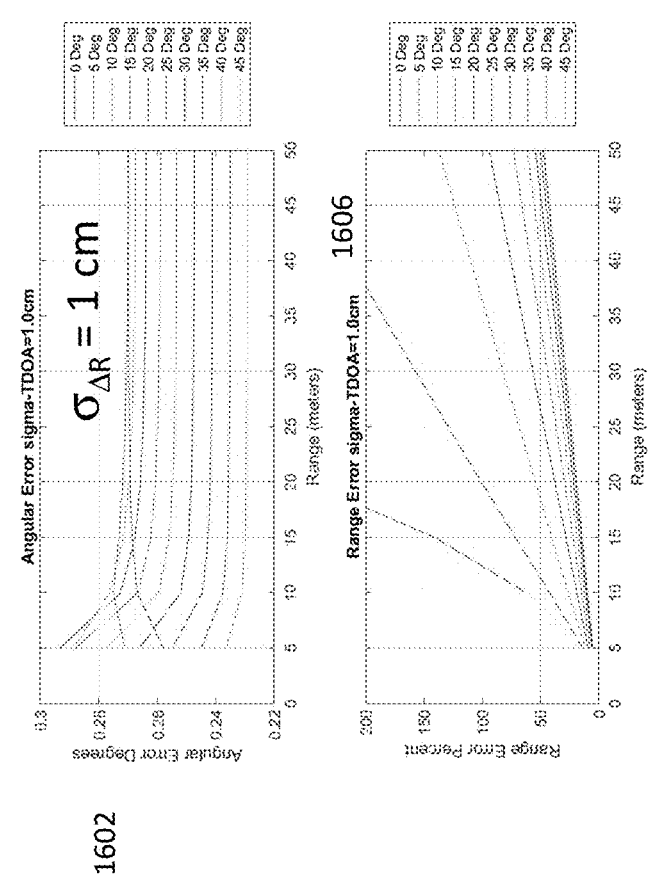

FIGS. 15A-B are graphs 1502 and 1504, respectively, illustrating received signal power. Graph 1502 illustrates a transmitter being at a height $h_t$ from a ground plane and a receiver being a height $h_r$ from the ground plane. The transmitter is a horizontal distance d from the receiver. In this example, the transmitter transmits a direct, line of sight signal having a distance l and a reflected signal, having a reflection angled off the ground by angle θ over distance x+x'. Graph 1504 illustrates the direct free space path loss (e.g., line-of-sight path l of graph 1502) in dBs against a reflected path (e.g., reflected path distance x+x' of graph 1502) over distances.

To calculate received signal power, the following equation can be used, where $P_{RX}$ is received signal power, $P_{TX}$ is transmitted signal power, $G_{TX}$ is antenna transmission gain, $G_{RX}$ is antenna reception gain, and $L_P$ represents path loss:

$P_{RX} + P_{TX} + G_{TX} - L_P + G_{RX}$,

FIG. 14 and the corresponding description note that with LTE, $P_{TX}$=23 dBm. While other standards may be used, for this example $P_{TX}$ is considered this constant. A person having ordinary skill in the art can recognize that with the use of other standards, other constants can be used.

In addition, $G_{TX}$ and $G_{RX}$ can be assumed to be 0 dBi for cell phone antennas, or omni antennas on the platform/vehicle used in the present disclosure.

$L_P$ represents path loss and is model-dependent. In one model that assumes a two-ray ground reflection model, the following equation can represent $L_P$ $$L_P = -10 \log \frac{\lambda}{4\pi R}^2 4 \sin^2\left(\frac{2\pi h_{RX} h_{TX}}{\lambda R}\right)$$

At short distances, this tracks free-space loss (e.g., $1/R^2$) with periodic fades.

At long distances, propagation is $1/R^4$:

$L_P = -20 \log(h_{RX} + h_{TX}) + 40 \log(R)$

The critical distance is $$R_{critical} = \frac{4\pi h_{RX} h_{TX}}{\lambda},$$

and the following variables can be assigned values as such:

$h_{RX} = h_{TX} = 1$ meter, and

λ=3e8/750 MHz=0.40 meter,

Accordingly, $R_{critical}$=31 meters.

Path loss is plotted in graph 1504, where 50-80 dB is a representative range. Considering when $L_P$ is 80 dB, $P_{RX}$=23−80=−57 dBm.

FIG. 16A-D are graphs 1602, 1604, 1606, and 1608, respectively, illustrating error ranges. While positions of RF sources can be determined and fused with other sensor data, it can be helpful to model the locations of objects to also know the error range of the determination. A person having ordinary skill in the art can recognize that time distance of arrival calculations are known. Using existing methods, it is possible to evaluate Cramer-Rao bounds for $\sigma_{AR}$=1 and 10 cm in the graphs of FIG. 16. Plots cover target positions from 5-50 meters and 0 to 45 degrees bearing using a 1.5×2 meter rectangular array. Accurate angular estimates (1602, 1604) are possible, even with 10 cm TDOA error. Range estimates (1606, 1608) can be more difficult, however. TDOA errors are very large with 10 cm TDOA error, but much better with 1 cm error.

FIG. 17 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 18:
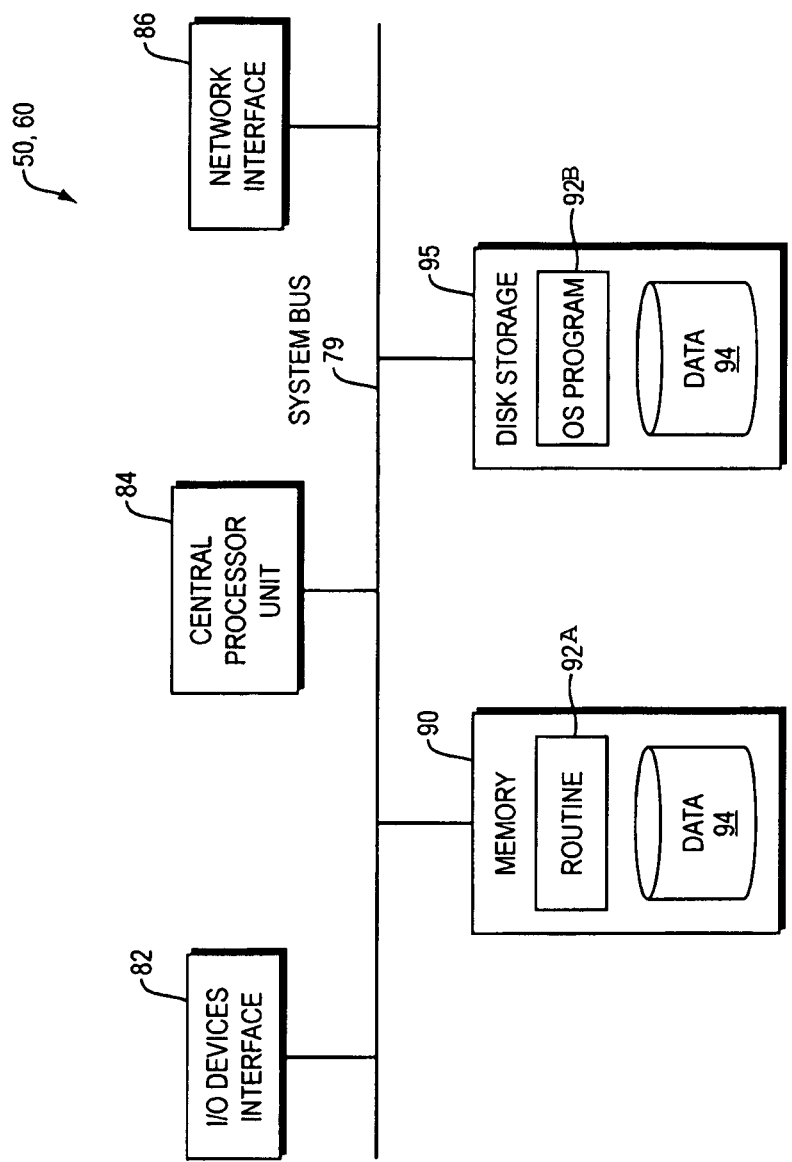
FIG. 18 is a diagram of an example internal structure of a computer (e.g., client processor/device or server computers) in the computer system of FIG. 17.

FIG. 18 is a diagram of an example internal structure of a computer (e.g., client processor/device 50 or server computers 60) in the computer system of FIG. 17. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 17). Memory 90 provides volatile storage for computer software instructions 92 and data 94 used to implement an embodiment of the present invention (e.g., sensor interface controller, perception controller, localization controller, automated driving controller, vehicle controller, system controller, human interaction controller, machine interaction controller, and platform detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
separating a heterogeneous radio-frequency (RF) signal, received at a plurality of antennas, the plurality of antennas having a known positional arrangement, into a plurality of homogeneous signals;
estimating a track of an object including at least one location relative to the known positional arrangement of the antennas of the object producing the RF signal based on phase and amplitude of each homogeneous signal as received at each of the plurality of antennas; and
determining whether the track of the object correlates with a second track of the object in an object list, the tracks of the objects in the object list determined by a perception controller and inputs from one or more of a radar system, lidar system, and stereo vision system.

2. The method of claim 1, wherein separating the heterogeneous RF signal into homogeneous signals includes separating the heterogeneous RF signal by one or more of waveform separation, frequency band separation, or other signal separation.

3. The method of claim 1, wherein separating the heterogeneous RF signal includes separating one or more of: a Long-Term Evolution (LTE) signal, a 3G signal, a 4G signal, a 5G signal, other cell phone signal, a WiFi signal, a WiMax signal, a Bluetooth signal, and a RF signal generated by a processor into respective homogeneous signals of the plurality of homogeneous signals.

4. The method of claim 1, wherein separating the heterogeneous RF signal further includes monitoring the heterogeneous RF signal for a handshake pattern.

5. The method of claim 1, further comprising:
estimating at least one of a velocity and an acceleration of the object producing the RF signal.

6. The method of claim 1, wherein the plurality of antennas are mounted on a vehicle, the method further comprising:
determining, at the vehicle, whether the estimated location correlates with the object in the object list;
if the determination correlates the estimated location with the object, adding the estimated location to data associated with the object in the object list; and
otherwise, adding a new object having the estimated location to the object list of objects detected by sensor from on-board sensors of the vehicle.

7. The method of claim 6, further comprising:
forwarding the found object or new object to a perception controller.

8. The method of claim 7, wherein the perception controller is configured to determine a path for the vehicle that avoids the found object or the new object.

9. A system comprising:
a plurality of antennas having a known positional arrangement; and
a processor configured to:
separate a heterogeneous radio-frequency (RF) signal, received at the plurality of antennas into a plurality of homogeneous signals;
estimate a track of an object including at least one location relative to the known positional arrangement of the antennas of an object producing the RF signal based on phase and amplitude of each homogeneous signal as received at each of the plurality of antennas; and
determine whether the track of the object correlates with a second track of the object in an object list, the tracks of the objects in the object list determined by a perception controller and inputs from one or more of a radar system, lidar system, and stereo vision system.

10. The system of claim 9, wherein separating the heterogeneous RF signal into homogeneous signals includes separating the heterogeneous RF signal by one or more of waveform separation, frequency band separation, or other signal separation.

11. The system of claim 9, wherein separating the heterogeneous RF signal includes separating one or more of: a Long-Term Evolution (LTE) signal, a 3G signal, a 4G signal, a 5G signal, other cell phone signal, a WiFi signal, a WiMax signal, a Bluetooth signal, and a RF signal generated by a processor into respective homogeneous signals of the plurality of homogeneous signals.

12. The system of claim 9, wherein separating the heterogeneous RF signal further includes monitoring the heterogeneous RF signal for a handshake pattern.

13. The system of claim 9, wherein the processor is further configured to estimate at least one of a position, a velocity and an acceleration of the object producing the RF signal.

14. The system of claim 9, wherein the plurality of antennas are mounted on a vehicle, and the processor is further configured to:
determine, at the vehicle, whether the estimated location correlates with the object in the object list;
if the determination correlates the estimated location with the object, add the estimated location to data associated with the object in the object list; and
otherwise, add a new object having the estimated location to the object list of objects detected by sensor from on-board sensors of the vehicle.

15. The system of claim 14, wherein the processor is further configured to forward the object or new object to a perception controller.

16. The system of claim 15, wherein the perception controller is configured to determine a path for the vehicle that avoids the found object or the new object.

* * * * *